United States Patent
Larcombe et al.

(10) Patent No.: US 9,215,207 B2
(45) Date of Patent: Dec. 15, 2015

(54) METHOD AND APPARATUS FOR ANALYSING AND MONITORING AN ELECTRONIC COMMUNICATION

(75) Inventors: Fraser James Larcombe, Sydney (AU); Jeffrey William Perrey, Somerville (AU)

(73) Assignee: PROTECTING THE KIDS THE WORLD OVER (PKTWO) LIMITED, Tyne & Wear (GB)

( * ) Notice: Subject to any disclaimer, the term of this patent is extended or adjusted under 35 U.S.C. 154(b) by 329 days.

(21) Appl. No.: 11/817,989

(22) PCT Filed: Mar. 7, 2006

(86) PCT No.: PCT/AU2006/000284
§ 371 (c)(1),
(2), (4) Date: Feb. 13, 2008

(87) PCT Pub. No.: WO2006/094335
PCT Pub. Date: Sep. 14, 2006

(65) Prior Publication Data
US 2008/0168095 A1     Jul. 10, 2008

(30) Foreign Application Priority Data

Mar. 7, 2005  (AU) .............................. 2005901055
Aug. 4, 2005  (AU) .............................. 2005904169

(51) Int. Cl.
G06F 17/13     (2006.01)
H04L 29/06     (2006.01)
(Continued)

(52) U.S. Cl.
CPC .......... *H04L 63/0227* (2013.01); *G06F 21/316* (2013.01); *G06F 21/6218* (2013.01); *H04L 63/30* (2013.01); *G06F 2221/2101* (2013.01); *G06F 2221/2149* (2013.01)

(58) Field of Classification Search
USPC ............................................ 704/10
See application file for complete search history.

(56) References Cited

U.S. PATENT DOCUMENTS 6,373,926 B1 * 4/2002 Foladare et al. .......... 379/88.13
6,563,817 B1 * 5/2003 Murai ........................ 370/356
6,857,027 B1 * 2/2005 Lindeborg et al. ............ 709/239
(Continued)

FOREIGN PATENT DOCUMENTS

WO    WO 04/001558        12/2003
WO    WO 2004/001558 A2 * 12/2003

OTHER PUBLICATIONS

Han et al., WO 2005/048120 A1, Text Summarization, Torola Inc, pp. 1-15.*

*Primary Examiner* — Andrew Goldberg
(74) *Attorney, Agent, or Firm* — Sughrue Mion, PLLC

(57) ABSTRACT

The present invention relates to a method and apparatus for monitoring electronic communications by way of determining the dialogue that takes place in an electronic communication. In one form the present invention provides a dictionary for analysis of an electronic communication comprising a store of expressions wherein the store of expressions is arranged according to: at least one section, each section corresponding to one of a plurality of grammatical functions; at least one subject, each subject corresponding to one of a plurality of categories of expressions for facilitating monitoring of an electronic communication. The present invention also provides a method and apparatus for monitoring an electronic communication utilising the above dictionary.

17 Claims, 7 Drawing Sheets

(51) Int. Cl.
*G06F 21/31* (2013.01)
*G06F 21/62* (2013.01)

(56) References Cited

U.S. PATENT DOCUMENTS

| | | | |
|---|---|---|---|
| 2002/0083351 A1* | 6/2002 | Brabenac | 713/300 |
| 2002/0107961 A1* | 8/2002 | Kinoshita | 709/225 |
| 2002/0174183 A1 | 11/2002 | Saeidi | |
| 2003/0009495 A1* | 1/2003 | Adjaoute | 707/501.1 |
| 2003/0093580 A1* | 5/2003 | Thomas et al. | 709/318 |
| 2004/0001086 A1* | 1/2004 | Brown et al. | 345/744 |
| 2004/0001090 A1 | 1/2004 | Brown et al. | |
| 2004/0111479 A1 | 6/2004 | Borden et al. | |
| 2004/0114740 A1 | 6/2004 | Gickler | |
| 2004/0158643 A1* | 8/2004 | Suzuki et al. | 709/232 |
| 2004/0210773 A1 | 10/2004 | Markosi, III | |
| 2005/0013300 A1* | 1/2005 | Akahane et al. | 370/395.3 |
| 2005/0202838 A1* | 9/2005 | Hiller et al. | 455/519 |
| 2006/0177059 A1* | 8/2006 | Tanaka | 380/243 |
| 2006/0206806 A1* | 9/2006 | Han et al. | 715/513 |
| 2007/0256083 A1* | 11/2007 | Vayssiere | 719/320 |

* cited by examiner

METHOD AND APPARATUS FOR ANALYSING AND MONITORING AN ELECTRONIC COMMUNICATION

RELATED APPLICATIONS

This application claims priority to Australian Provisional Patent Application No. 2005901055, filed 7 Mar. 2005 and Australian Provisional Patent application No. 2005904169, filed 4 Aug. 2005 both entitled "Method and Apparatus for Analysing and Monitoring an Electronic Communication" and, the specifications thereof are incorporated herein by reference in their entirety and for all purposes.

FIELD OF INVENTION

The present invention relates to the field of electronic communications. In particular the present invention relates to a method and apparatus for monitoring electronic communications by way of determining the dialogue that takes place in an electronic communication. It will be convenient to hereinafter describe the invention in relation to an Internet chat session conducted over an Internetworking connection between a PC and a publicly accessible information network. However, it should be appreciated that the present invention is not limited to that use, only.

BACKGROUND ART

Throughout this specification the use of the word "inventor" in singular form may be taken as reference to one (singular) or all (plural) inventors of the present invention. The inventor has identified the following related art.

Computer networks are in use in almost every aspect of home and business life. The same may be considered to apply for communication networks, in general. Accordingly, communication network traffic generally has been the subject of substantial discussion. Many products have been developed that may monitor network traffic and the flow of traffic past a given point in a computer network. With rapid advances in mobile phone and portable computing device technology, network traffic has now become somewhat ubiquitous, which only serves to increase the burden of monitoring such traffic.

Online services such as the Microsoft® Network offer facilities for multiple users to simultaneously chat with each other in real-time. Generally, a chat room may be provided to members of the service for remote discussion on a particular topic of interest. Owing to the relative anonymity of the participants, chat room conversations may often get out of hand, become off-topic, offensive and even create possible legal issues for the online service provider as a result. To deal with such improper use, online services may hire employees to monitor chat room conversations. In the event of the chat room conversation involving improper dialogue, the manual monitoring process may further involve providing alerts to users at either end of the conversation to act as warnings for the detection of unacceptable content within the chat session that has been manually monitored. Determining what exactly may be unacceptable content may accordingly require substantial intervention by a human being. As a result, to effectively monitor what is taking place in the chat room, each chat room requires an active and dedicated monitor at virtually all times. Moreover, it is difficult to attain reliable and consistent record of terms used in a conversation that may be considered unacceptable or, furthermore, become recognised as unacceptable in time or over time. As would be recognised by the person skilled in the art, this may be expensive in terms of manpower and may also lead to errors which can alienate users or subscribers.

As an example of the problems faced with modern communications, the growing popularity of the internet increases a parent's desire to locate safe and fun websites for their children's use. Parents naturally want to prevent their children from using websites that link to undesirable content (pornography, violence, etc.). Likewise, parents also wish to prevent their children from interacting with strangers in an online chat room or discussion group. Previous attempts to limit children's access to the internet have mostly involved software programs like Surfwatch™ or Net Nanny™. These programs have allowed a child to freely browse the World Wide Web, but have blocked access to prohibited websites that are listed in prohibited site libraries that are updated periodically. These methods are directed to determination of sites that may be visited and rely on the listing of the prohibited sites. Accordingly, they do not determine an exchange of undesirable conversation or content per se. These methods work adequately for screening undesirable content based on a determination of prohibited sites, but do nothing to provide high quality, safe communication sessions for vulnerable users.

In a slightly different application, a method may be to scan a document for words on a "hit list" of unacceptable words, and deny access to those documents containing a word on the hit list. This technique for identifying inappropriate documents may screen or deny access to numerous acceptable documents whilst web surfing, for example. For instance, if the word "breast" is on the list, then the software would deny access to documents describing cooking recipes for chicken breast or for medical documents on such important issues as breast cancer. In this way the use of word based lists as a tool may often screen out useful educational information.

Businesses are often interested in limiting not only what employees cannot access but also limiting what they can access. For this reason, businesses may use firewall software that would prevent their employees from accessing any Internet sites except those specifically sanctioned or on an approved list. However, such techniques may be counterproductive because the employee may be limited from accessing a work-related site that is not on the approved list, such as a site linked to or mentioned from a site on the approved list.

In U.S. patent application Ser. No. 10/606,517 (Borden et al), filed 25 Jun. 2003 and published under publication No 2004/0111479 on 10 Jun. 2004, there is disclosed a system and method for online monitoring of and interaction with chat and instant messaging participants. The method and system of Borden involves a complex and diverse determination of a monitoring event where a monitoring event comprises a combined or simultaneous existence of certain defined factors associated with a particular exchange relating to, the exchange's participants, content of the exchange, recent history, and/or the tone of exchange or conversation. On line communications are monitored and input to a number of pattern recognising modules working in parallel. The pattern recognition modules use known pattern recognition techniques available at the time of Borden's filing such as, a generic word finder using a stored dictionary of words, Natural Language Parsers implementing stochastic methods such as hidden Markov models to tag words, Bayesian filters and neural network filters. The outputs of the pattern recognisers are then correlated using Artificial Intelligence techniques to determine state variables on which decisions may be made to alert persons to the determined monitoring event based on decision algorithms. The inventor has recognised that the system of Borden may be inefficient in as much as it does not readily differentiate between communications that may be deemed to be "safe" or otherwise for the conversation participant and communication traffic that is unverified or uncontrolled. Furthermore, use of high level AI or Machine Learning algorithms as proposed by Borden et al may create bottlenecks due to the high level of computational complexity. Since Borden's system uses rules that over time can change, the system is potentially always learning and therefore may be prone to inaccuracies from time to time. Effectively, the system proposed by Borden needs to learn prior to being accurate and then it needs to continue to learn. Chat room data, for example, may have ever moving states. Using Borden's techniques eventually may lead to high levels of complexity which can ultimately categorise data incorrectly.

It would be desirable to provide a system for monitoring electronic communications that was not reliant on complex AI or Machine Learning paradigms which require a high order of complexity.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

An object of the present invention is to at least provide a useful alternative to the related art.

A further object of the present invention is to alleviate at least one disadvantage associated with the related art.

SUMMARY OF INVENTION

In one aspect the present invention provides a dictionary for analysis of an electronic communication comprising a store of expressions wherein the store of expressions is arranged according to:

at least one section, each section corresponding to one of a plurality of grammatical functions;

at least one subject, each subject corresponding to one of a plurality of categories of expressions for facilitating monitoring of an electronic communication.

In a preferred embodiment the store of expressions comprises at least one Hash Table.

In another aspect the present invention provides a method of monitoring an electronic communication comprising the steps of:

sampling an electronic communication;

applying a dictionary as disclosed hereinabove to the sampled communication;

determining an aggregate level for the sampled communication.

Preferably, the method of monitoring further comprises the steps of:

indicating the determined aggregate level to one or more of:

a party to the electronic communication;

a third party to the electronic communication.

In yet another aspect the present invention provides a method of monitoring an electronic communication comprising the steps of:

sampling an electronic communication with the use of filtering means to determine untrusted communication data from trusted communication data;

applying a dictionary as claimed in any one of claims 1 to 3 to the untrusted communication data;

determining an aggregate level for the untrusted communication data.

In a further aspect the present invention provides a method of monitoring an electronic communication comprising the steps of:

sampling the electronic communication;

preconditioning the sample obtained by the step of sampling so as to provide a set of expressions;

comparing the set of expressions with a dictionary of stored expressions where an alert level is associated with each stored expression;

accumulating each match of an expression with a stored expression in a results collection.

In a preferred embodiment the method of this further aspect of the invention further comprises the step of:

determining a score for the results collection in accordance with predetermined rules where the determined score corresponds to an aggregate alert level for the matched expressions, and;

selecting one or more subjects for monitoring such that a selection of the set of expressions are subjected to the method of monitoring.

In another embodiment, the predetermined rules for determining a score are based on criteria relating to the relationship of words in an expression of one section of the dictionary to words in an expression of another section of the dictionary.

An electronic communication may comprise one of:

an internet chat session;

a mobile telephone call;

a WWW browsing session;

an email communication; or other similar communications such as SMS or MMS.

In yet another aspect the present invention provides apparatus adapted to monitor an electronic communication, said apparatus comprising:

processor means adapted to operate in accordance with a predetermined instruction set; and, said apparatus, in conjunction with said instruction set, being adapted to perform the method steps as disclosed herein.

An embodiment of the present invention provides a computer program product comprising:

a computer usable medium having computer readable program code and computer readable system code embodied on said medium for monitoring an electronic communication within a data processing system, said computer program product including:

computer readable code within said computer usable medium for performing the method steps of the method as disclosed herein.

In the context of the present invention a dialogue is a conversation between two or more persons, which may transmitted by electronic means; also, a dialogue may be taken to be a similar exchange between a person and something else, such as for example, a computer or a communications network entity. Included in a dialogue may be an exchange of ideas and opinions. Such communications may be conveyed in a digital electronic communication or an analog electronic communication.

Other aspects and preferred aspects are disclosed in the specification, comprising the accompanying drawing, and/or defined in the appended claims, which all form a part of the description of the invention.

In essence, the present invention stems from the realisation that providing a dictionary having not only meanings for words but also a grammatical function and thematic subject for each entry in the dictionary leads to a determination of the context and intent within a communication or discussion. Furthermore the present invention provides a means by which communication data which does not pose a potential threat to the user may be efficiently ignored and so allow for an efficient processing of communication data that may pose a threat such that if an unwarranted activity becomes apparent, it may be acted upon quickly. In turn a more realistic supervision of a communication may result.

The inventor considers that there is no real time mechanism presently available, for example, for the protection of young children on the internet from the predatory activities of paedophiles and perverts. For this purpose, there is only one real time choice at present and that is the parent/guardian must sit with their child for the duration of every period they spend on the Internet.

The present invention has been found to result in a number of advantages, such as the following.

- a communications monitor, for example, a chat alert may be provided that monitors the conversation rather than what is said word by word.
- manages the tense of the conversation ie is the user being groomed or just speaking at random.
- prevents foul language in communication.
- prevents discussions about sex.
- allows a parent to set levels of response for activities on the net for their child.
- allows a parent to receive an SMS text when real time danger affects their child.
- allows a parent to send an SMS message so as to react to a real time situation that concerns their child.
- allows a parent to set a response within a computer to do one or more of: a) Warn the child; b) Shut down the communication; c) Shut down the computer.
- the software can intuitively monitor a communication over a period of time, to stop the predatory approach by a paedophile.
- can shut down the PC or laptop if you do not wish to allow your child to give out specific information about themselves or their location.

The use of simple fast accessed structures and algorithms allows the present invention to perform and update in real time The present invention provides algorithms based on the available data and only on the available data not any other AI rules, and is therefore able to provide correct assessments of input language in all instances from the first data pass The software application can be modified to:
  Interpret any sensitive information;
  Use intelligent data packet sniffers; and
  Integrate other peripherals such as mobile phones and PDAs.

This invention, therefore, has been driven by the need to close a hole that presently exists in electronic data communication between participants. The invention is, therefore, designed to analyse and provide options to administrators as to how to treat the threat or abuse of these electronic data communications portals (i.e. Chat Rooms as one example).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Preferred embodiments of the present invention relate to electronic communications where data is analysed and interpreted based on a given or chosen level of response. The present invention is to be described now with general reference to the attached flow charts of FIGS. 1 to 7.

In a preferred embodiment, the present invention comprises the following parts:

(a) A data communications analysis engine that collects and assembles packets at a primary (or raw) level for further analysis;
(b) A dictionary or linguistics monitoring engine (or database) that provides intelligent groupings of characters and words to provide analysis as a secondary level (or more human interpretation level);
(c) A matching and categorisation algorithm (or engine) that interprets and categorises the data collected and analysed at the primary and secondary level. This algorithm produces a grading that vary as the data collected varies;
(d) A security warning algorithm that makes decisions about actions to be enacted based on user defined (or system generated) warnings levels;
(e) A request and response engine that allows the administrator to receive and respond to messages/requests generated by the security warning algorithm; and
(f) A system log engine that records and categorises the data, actions and states of the overall system.

Each individual component is now described.
The Data Communications Analysis Engine:

As electronic communication data comprising the content of an electronic communication is passed from one user to another it is transmitted as data packets in binary form (i.e. 1's and 0's). The data communications analysis algorithm may comprise a packet sniffer that captures the raw data packets and then assembles the packets into information that is more easily interpreted (i.e. words). Each such assembled packet comprises "header information", "packet information", "packet data" and "footer information".

Figure 1:
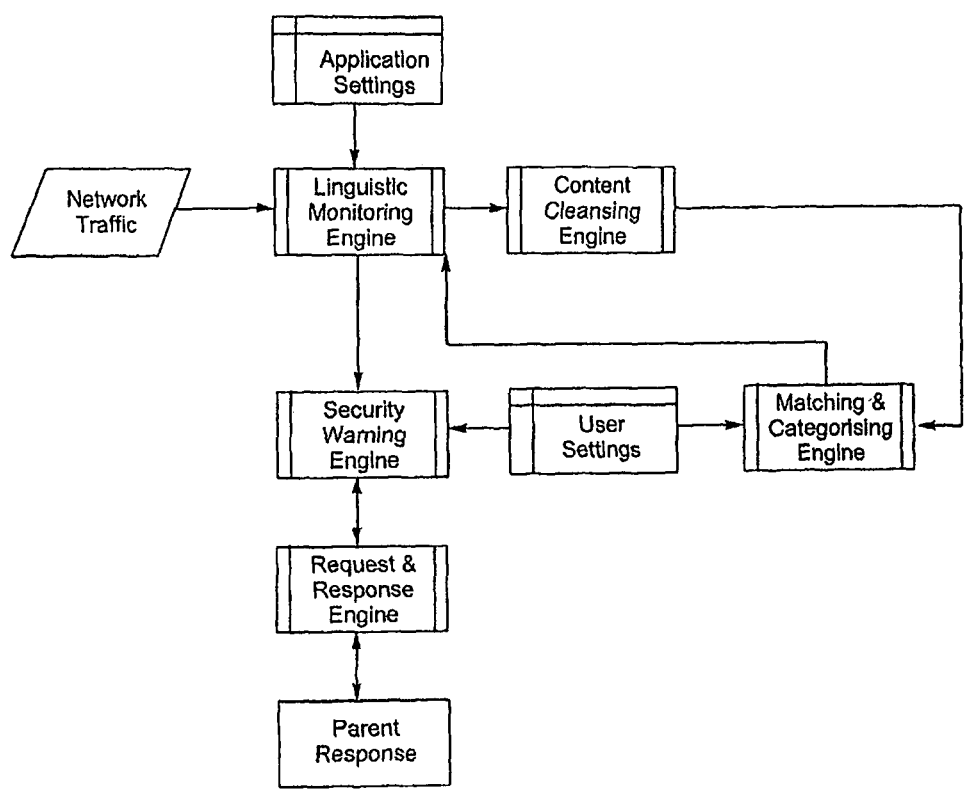
FIG. 1 is a flow chart of a system in accordance with the present invention

The Linguistics Monitoring Engine, and the Matching and Categorisation Algorithm:

A preferred system embodying the present invention may best be described by the flowchart of FIG. 1, in which there is provided:
- (a) a data interpretation or analysis engine that collects electronic data (preferably defined as packets) and passes this information through in a form that can be analysed;
- (b) use of a linguistics monitoring engine for determining the conversation occurring between one or more participants on any chat room with the use of a dictionary as disclosed herein;
- (c) based on the electronic conversation taking place and alert states or levels for monitoring internet chat sessions, the software alerts the administrator;
- (d) levels of interaction where an administrator can choose a number of actions based on responses via email or SMS; and
- (e) electronic logs to store and analyse electronic data transmissions.

Figure 2:
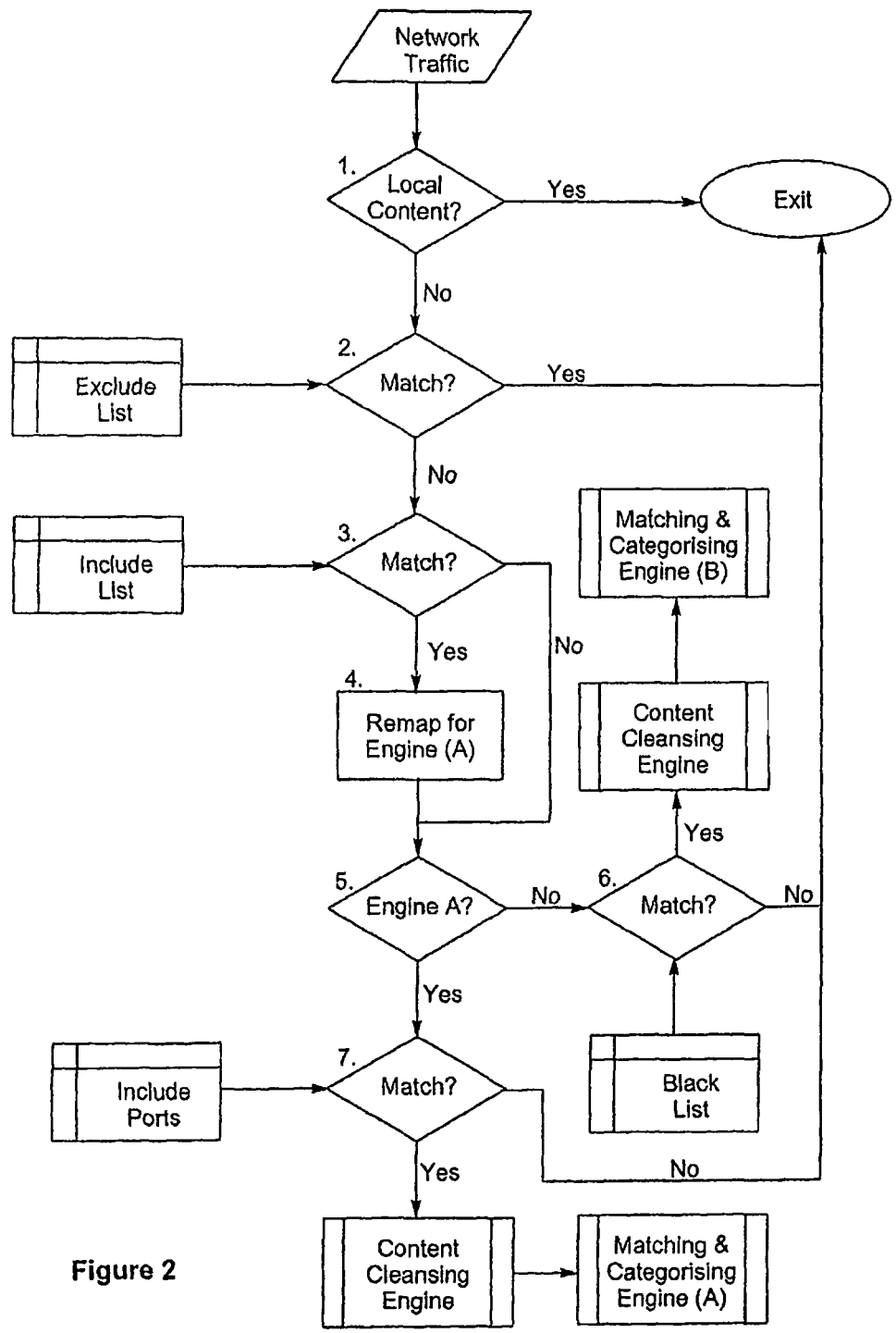
FIG. 2 is a flow chart of a linguistic monitoring engine which utilises a dictionary in accordance with a preferred embodiment of the present invention.

The Linguistics Monitoring Engine utilizing a dictionary as disclosed herein can be best described by the flowchart of FIG. 2. Upon creation the linguistic monitoring engine iterates through network adapters on a local machine to determine which one maintains the systems default connection for communications. Once this adapter is located the linguistic monitoring engine binds to that adapter in order to receive notification of all incoming network traffic. The output of the linguistic monitoring engine is split up into two identical parts and data is sent to a specific matching & categorizing engine based on which of these two parts it originated. One of the matching & categorizing engines may be for internet chat traffic (A) and the other internet traffic (B). Other alternatives are envisaged by the inventor. The following steps in the flow chart of FIG. 2 are now described as numbered.

1. As a filtering step, the IP address range of the incoming traffic is examined to determine if the IP address exists on a local internal network (192.168.*.*, 10.0.*.*). If it is found to exist in this range it may be ignored.
2. A list of IP addresses to exclude from analysis is loaded from an XML document into an ArrayList. If the IP address of the incoming traffic matches one of those listed in the ArrayList it is ignored. This XML document is managed and updated by the parent via the ChatAlert! user interface.
3. Certain websites also operate internet chat applications. These may vary from typical instant messaging (IM) applications such as MSN and Yahoo in that they also contain a great deal of additional HTML traffic. Because of this the present invention may preferably maintain an include list, which is a list of sites (IP addresses) that are to be treated as IM applications, irrelevant of the fact that they are web based. This list may also be maintained by the parents through the user interface and stored in an XML document. Internally this list may be loaded from the XML document into an ArrayList.
4. If the incoming traffic matches one of the IP addresses listed in the include list its originating port is reset to 0.
5. At this point we may differentiate between the two matching & categorizing engines. Any incoming traffic that has a port of 80 is classified as web based traffic (B). Everything else may be classified as IM traffic and sent to (A).
6. In order to prevent the monitoring system from having to scan every site on the internet that the child may visit the application maintains a list of known 'black' web sites. This list may be provided from a 3$^{rd}$ party vendor in the form of an XML document containing IP addresses. This list is loaded into an ArrayList and used to match against the incoming traffic. If a match is not found the site is considered to be acceptable for child viewing and may be ignored. In addition to the list from the 3$^{rd}$ party vendor the present system also allows parents to add to this list through the user interface. The blacklist may be updated at anytime by administrators and may be automatically downloaded by the software of the present system to ensure it is up to date. Advantageously, an automatic download and update may retain all settings the parent has previously specified as an addition to the black list.
7. A list of known ports are loaded into an ArrayList. This list is internal to the application and may be specified by the developers before release to market. The incoming traffic may then be compared against the ArrayList and if a match is not found it can be ignored.

Once the incoming traffic has made it this far without being ignored or filtered it is then sent off to the relevant content cleansing and matching & categorizing engines.

Figure 3:
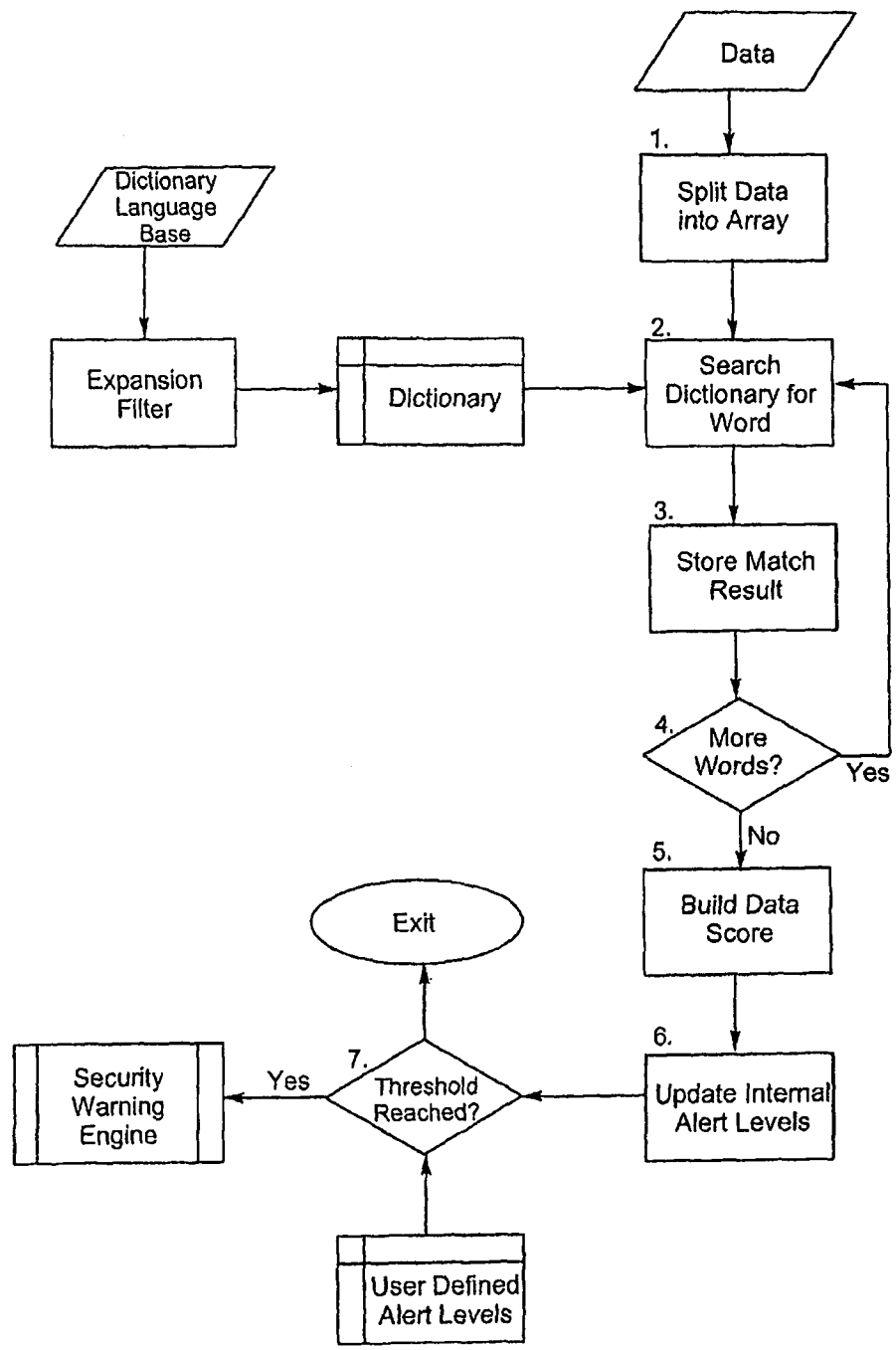
FIG. 3 is a flow chart of a matching and categorisation engine in accordance with a preferred embodiment of the present invention.

The Matching Categorisation Engine can be best described by the flowchart of FIG. 3. The matching and categorizing engine maintains an internal listing of words or phrases. This information may be loaded from an XML document into a HashTable (Due to the dynamics and high search speed of a HashTable) and allocated a score based on its category and intensity level. Using Hash-tables allows the system of the present invention to categorize data in a way that allows for quick data lookup or quick computer (algorithmic time). In addition, the present invention can place data within the structure is quick computer or algorithmic time. Computer or algorithmic time is calculated in process steps and depending on the type of Hash-table used, the inventor has realised that it is possible to achieve access times typically of the order $n\log_n$ (or $O(n\log_n)$) where 'n' refers to the number of entries in the Hash-table at any one time. The categories of content to be loaded may be specified by the parent through a user interface. Part of the interface may preferably allow parents to adjust the sensitivity of the matching & categorizing engine. Preferably, there are 4 types of alerts, low, medium, high and immediate. The match score required by each of these alerts before a threshold is reached can be varied by the parent via the sensitivity section of the interface. These words may be built upon by an expansion filter by adding extensions to the dictionary words such as "s", "er", "z", "ing", etc to increase the scope of the matching engine. The expansion filter is explained in further detail below. The following steps in the flow chart of FIG. 3 are as numbered.

1. Data arrives from a content cleansing engine and is split into an Array around the space ' ' character.
2. The Array of data is iterated and matched against the Hash Table.
3. If the word is found it is added to an internal collection of search results.
4. Repeat steps 2-4 until all the words in the Array have been searched.
5. Based on the matches in the internal collection of search results a score is composed.
6. Internally managed alert levels are maintained to keep track of the incoming conversation data. The score composed in step 5 is added to the internal alert level.
7. If any of the newly adjusted internal alert levels has reached or exceeded threshold limits set by the parents then an alert is raised. This alert is sent to a security warning engine for further processing. Alternatively if none of the thresholds have been reached the process exits and awaits further data for processing.

Figure 4:
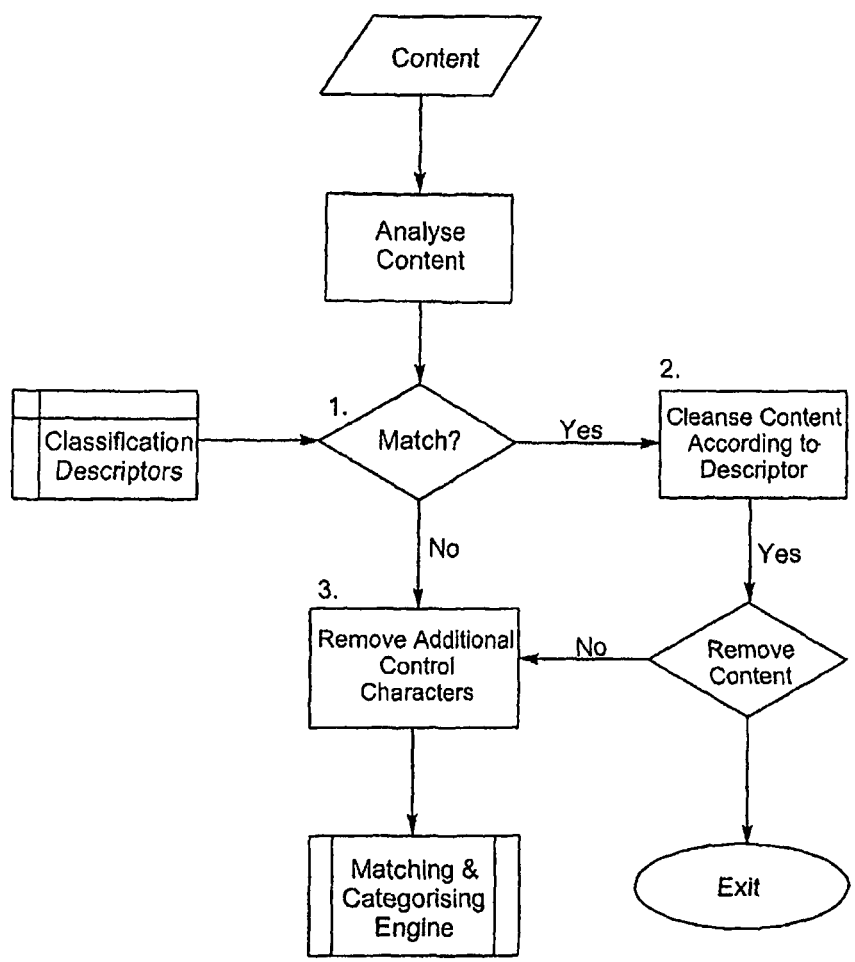
FIG. 4 is a flow chart of a content cleansing engine in accordance with a preferred embodiment of the present invention.

There is also a content cleansing engine that can be best described by the flowchart of FIG. 4. The content cleansing engine may be used similarly as a filter to remove all non relevant data from incoming data. This includes things such as HTML, control characters and IM specific data such as 'User XXX as signed in' notifications. The following steps in the flow chart of FIG. 4 are as numbered.

1. The content cleansing engine maintains an internal collection of classification descriptions. These descriptors are templates that can be used to describe certain types of internet traffic. Each descriptor is applied to the incoming data in order to determine a match.
2. If the incoming data matches one of the classification descriptors then the data is cleansed according to that descriptor. Depending on the descriptor this may be the complete removal of the content.
3. Incoming data is stripped of all control characters. This includes all characters not part of the standard ASCII character set, along with CRLF (carriage return line feed), commas, full stops, apostrophise, inverted commas etc Once cleansed (if not removed in step 2) the data is passed to the matching and categorizing engine.

Figure 7:
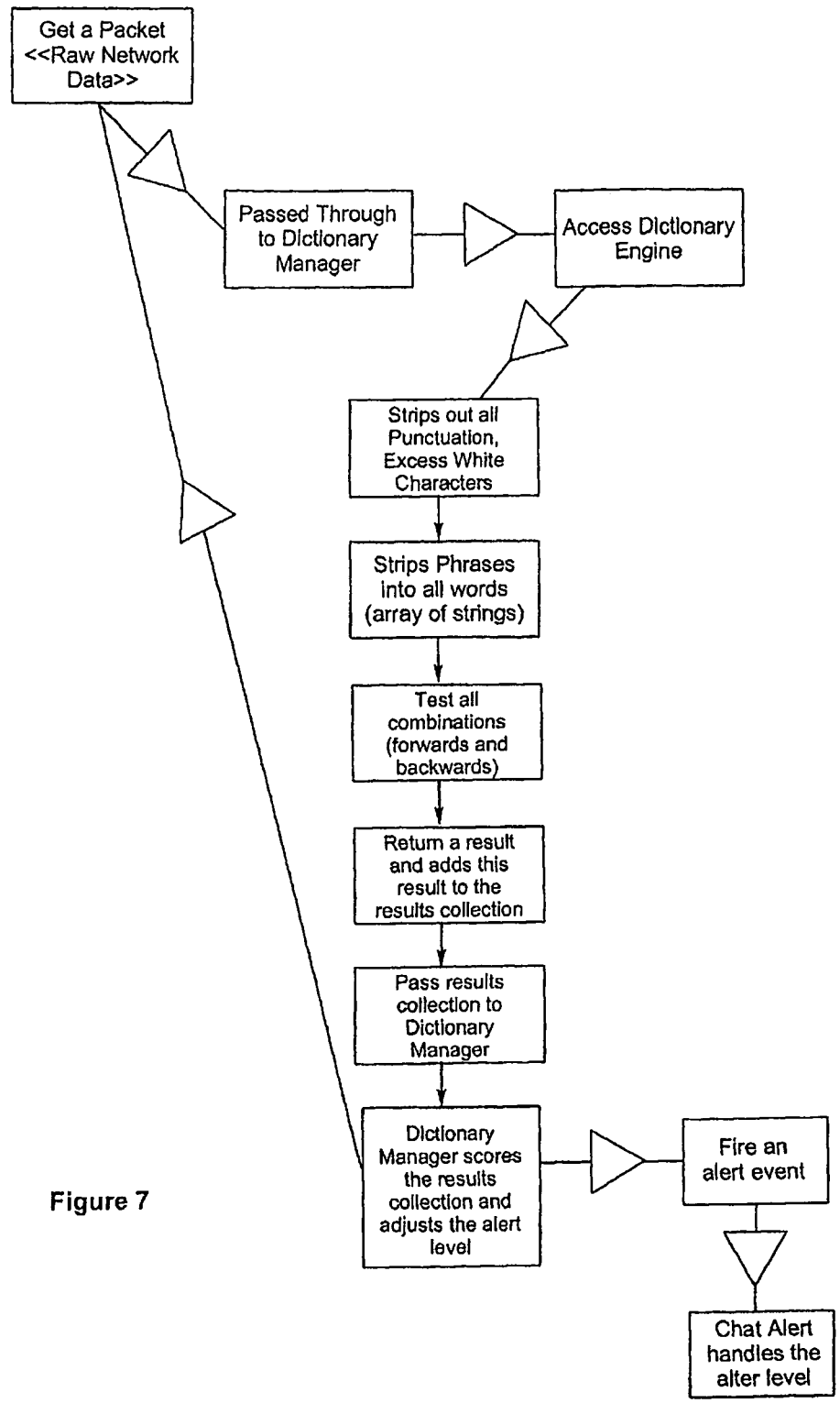
FIG. 7 is a flow chart of an overall monitoring system in accordance with embodiments of the present invention.

A number of further concepts with respect to the linguistic monitoring engine and its use of the dictionary of the present invention are now described with general reference to the flow chart of FIG. 7.

Dictionary

A dictionary as disclosed herein may take the form of a store or list of expressions, namely, words or phrases that are used when analysing the users conversation in an electronic communication. The dictionary definition is made up of various sections and subjects. Each expression may also be defined within a level that is used for scoring the phrase.

Section

A section is a logical way of breaking up the words for management and input and corresponds to grammatical functions shared by the expressions. The sections defined within the dictionary of a preferred embodiment are:

Acronyms:
In acronyms we are placing all of the common acronyms for words. Some of these include:
F2f—face to face
Asl—age sex location
Actions:
Actions are common actions that we may wish to monitor, such as:
F**ck
Kill
Kiss
S**k
Emotions:
The emotions section contains any general words that may be related to emotions, for example:
Love
Hate
H8
like
Linking:
The linking section should contain general words/phrases that could be used for linking that we may wish to alert on. Some of these may be:
Me
My
Your
Our
Objects:
The objects sections should contain anything that can be classed as an object, such as:
Penis
Dildo
Heroin
Lingerie
Roles:
The roles section should contain the definitions of various different roles or personas, such as:
Mother
Father
Teacher
Policeman
Suggestive:
The suggestive section should contain any word/s that may be taken as the beginning of a suggestion/question.
Can you
I can
Would u
Dya av
Swearing:
The swearing section should contain any word/s that may be classed as a swear word.
F**k
S**t
K**t
C**t The distinction between these categories may be somewhat arbitrary and is open to further break down in the future.

Subject

A subject is a group of words that may be associated with chat alert for monitoring.
Currently the subjects include:
Affection
Bullying
Drugs
Family
General
Meeting
Sex
Stalking
Swearing These subjects are directly linked to options in chat alert that allow the user to turn on/off certain subjects for monitoring.

All topics bar General may be administered via the chat alert administration panel. Words that are categorized as general are loaded by default as they have been determined to be either important or too general. This means it is a topic with content that an administrator deems too important for users to be able to turn on and/or off. Alternately, this means that it is a topic or content that may be classified as "too" general ie cannot be classified under another topic or under one of the other subjects.

Level

There are preferably 3 levels defined within the dictionary. These levels comprise:
High
Medium
Low Each of the above levels map to a score that will be passed onto the relevant words/phrases. The score is then used if the word is found during text analysis.

Expanding the Results

To help find a match when each word is read into the dictionary, it is run through an expansion filter that adds further combinations to the words. This is so we can expand the word to cover all of the common iterations.

In a preferred embodiment, the expansion filter comprises: "en", "ing", "in", "s", "er", "ed", "z", "d", "n", "erz"

As an example, consider the word f**k. After the expansion filter all of the following words would exist in the dictionary:

F**k
F**ken
F**king
F**kin
F**ks
F**ker
F**ked
F**kz
F**kd
F**kn
F**kerz

This practically multiplies the dictionary by 11, increasing the chance of a match accordingly.

Dictionary Matches

The dictionary makes its matches using a combination of words found in the dictionary, finally working out an over all score.

Consider the following excerpt of conversation:
Line 1: <User A> I like little girls
Line 2: <User B> I am little, do you want to f**k me
Line 3: <User A> Only if I can f**k you in the arse When analysing the above text, the dictionary engine would step through (both forwards and backwards) each word and work out if it could be matched with a word or phrase within the dictionary.

Below is some explanation of what the engine would find from the above conversation:

| Line no | Word/phrase | Section | Level | Score |
| --- | --- | --- | --- | --- |
| 1 | Like | Emotions | Low | .1 |
|  | Little girls | Roles | High | .3 |
| 2 | I am | suggestive | Low | .1 |
|  | Do you | suggestive | Low | .1 |
|  | Want to | suggestive | Low | .1 |
|  | F**k | sex/swearing | High | .3 |
|  | Me | Linking | Low | .1 |
| 3 | I can | suggestive | Low | .1 |
|  | F**k | sex/swearing | High | .3 |
|  | You | Linking | Low | .1 |
|  | Arse | Objects | High | .3 |

A word classified as high has a score of 0.3, a word classified as medium has a score of 0.2 and a word classified as low has a score of 0.1.

The linguistics monitoring is constantly monitoring the current conversation or communication dialogue and ranking it based on the score and alert level.

The chat alert engine currently monitors 45 lines and keeps a running total of the score. Considering the above example, in 3 lines the combined score would have generated a low level alert and be half way to generating a medium level alert. This shows how the present invention monitors the conversation rather than what is said word by word.

In a preferred embodiment, there are 4 alert levels as follows:
High Alert—If the score of the conversation hits 3
Medium Alert—If the score of the conversation hits 2
Low Alert—If the score of the conversation hits 1
Immediate—If a single line scores 1 or more The High, Medium and Low alert levels work by adding the scores of multiple rows. Immediate alerts are generated when a SINGLE row scores above 1. The alerts are generated on the sum of the score each row produces. Therefore the sum of the scores that each word adds 0.1, 0.2, 0.3) etc would trigger the appropriate alert level as it passes the threshold of 1, 2 or 3 etc With the recent addition of the sensitivity sliders, a user may change these thresholds so as to alert at appropriate levels as specified by the user. The purpose of the sensitivity sliders are so that the user may adjust the sensitivity of the alert levels. This works by applying a modifier to the alert level. For example, high starts at 3, but after the modifier from the value of the sensitivity slider is applied it may end up at 5.

Exceptions to the Rule

During the development of the dictionary the inventor found that it was making a lot of false alerts based on suggestive and linking words. To combat this problem we made the rule that a suggestive or linking word must be linked with one of the alerts before it would be counted, this cut down on many false alerts that we would be getting.

Further rules, for example, based on criteria relating to the relationship of words in an expression of one section of the dictionary to words in an expression of another section of the dictionary may be developed for this system to further cut down on the false alerts generated by day to day conversation.

Namespace Structure

A dictionary dll (dynamic linked library) has been created using a relevant namespace structure. The structure is as follows:

Spectral.ChatAlert.Dictionary
Dictionary.cs
SearchResults.cs
Spectral.ChatAlert.Dictionary.ChatAlertDictionaryManager
AlertLevels.cs
DictionaryManager.cs
Spectral.ChatAlert.Dictionary.ChatAlertDictionaryHashTable
HashTable.cs
Spectral.ChatAlert.Dictionary.ChatAlertDictionaryEngine
Engine.cs Class Listing Below is a brief overview of the functions of each of the classes used.

Dictionary.cs
A class used to Define dictionaries.
SearchResults.cs
A class used to define the objects to be used to define and contain a collection of
Search results.
AlertLevels.cs
A class used to define the objects to be used to define and contain a collection of alert levels.
DictionaryManager.cs
This class is used to manage a series of several dictionary objects used for different sections
HashTable.cs
The hash table class is used to load, store and manage the dictionary words/phrases.
Engine.cs
The engine class contains the various static functions used for searching and managing the dictionary objects.

Dictionary Pseudo Code

In this section you will find pseudo code to cover most if not all of the main functions of the dictionary dll.

Loading the Dictionary

This is the basic process that takes place to load a dictionary to the point that it can be searched upon.

Calling Class

Define alert levels (Description, score, immediate alert?) [Note: In this example, "Description" may be "High". Score may be 3, and it may not be an immediate alert as an example]
Define subjects to be monitored
Create dictionary object passing in subject list as a custom collection.
Dictionary
Create hash table objects for each section.
Call load on each hash table object
HashTable
Create XmlTextReader object
Read xml dictionary definition from dictionary (compiled into exe)
Iterate through each row of the dictionary.
Load relevant Words/Phrases (Based on subject) and score values into Hash table (After running through the expansion filter.
Return populated HashTable object.
Dictionary
Return populated dictionary object
Calling Class
Create dictionary manager object passing in the populated dictionary object and the alert level list as a custom collection.
Searching the Dictionary
This process describes what occurs when a search operation takes place.
Calling Class
Call search on the dictionary manager passing in the data to search as a string
Dictionary Manager
Call search on the internal dictionary object passing in the data to search as a string
Dictionary
Call search function in the dictionary engine passing in the data to search as a string and each of the hash table objects
Engine
Remove punctuation and multiple spaces from phrase
Split into words based on spaces
Iterate through each of the HashTable objects
Use a recursive function to iterate through each word in the list (both forward and backward) checking for a match on a word/collection of words within the current HashTable object.
Add match results to a results collection
When searching complete, return the results collection
Dictionary
Return results collection.
Dictionary Manager
Iterate through the results collection.
Add up the score based on predetermined rules defined
An example rule may be, suggestive and linking words must have a word from another section to alert
Add up score of the search results
Add the score to the collection of rows currently being monitored
If required remove the score of the rows that are no longer being monitored.
Calculate the Alert Level
Add up the value of the score collection
Iterate through the alert levels collection
Test to see if the alert level has changed
If the alert level has increased fire the AlertLevelIncrease event If the alert level has decreased fire the AlertLevelDecrease event
Calling Class
Catch fired events and handle as required.
Altering an Alert Level Definition
This process takes place when the list of alert levels needs to be altered.
Calling Class
Define new alert levels collection (Description, score, immediate alert?)
Set the dictionary alert levels property [Note: A property may be a means of passing a value into a class/object. Here we pass a new collection of alert levels in so that the values may be adjusted] to the new collection
Dictionary Manager
Set the internal alert levels collection to the value of the property
Altering the Subjects Selected for Monitoring
This process takes place when the list of subjects to monitor has been changed.
Calling Class
Define new subjects collection
Set the dictionary managers subjects property to the new collection
Dictionary Manager
Set the internal alert levels collection to the value of the subjects
Reload the dictionary based on the new subjects
The Dictionary Data Structure
The data structure can be defined using an XML snippet. Below is one such snippet. See Appendix A for a more complete dictionary.

```
<Suggestive>
    <High>
        <General>
            <Phrase>I can</Phrase>
            <Phrase>ill</Phrase>
        </General>
    </High>
</Suggestive>
```

Or simply put, follow the following structure definition:

```
<Section>
    <Alert level>
        <Category>
            <Phrase> </Phrase>
            <Phrase> </Phrase>
            ...
        </Category>
    </Alert level>
</Section>
```

Hash Tables

The words and phrases are stored in a Hash Table. The overall structure of these hash tables are as follows:

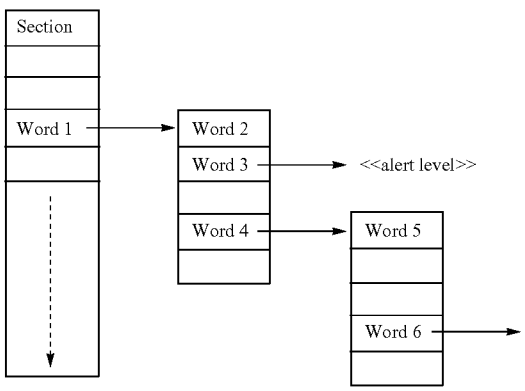

A section could be a role for example. Each entry in a hash table can end with a value (Alert Level) or continue to another hash table.

The Security Warning Algorithm:

Since, in accordance with the present invention, it is possible to collect data, analyse it and create categorisations of the data that varies as the data gathered grows, a security warning algorithm will preferably react depending on the state or level of the categorisation.

Figure 5:
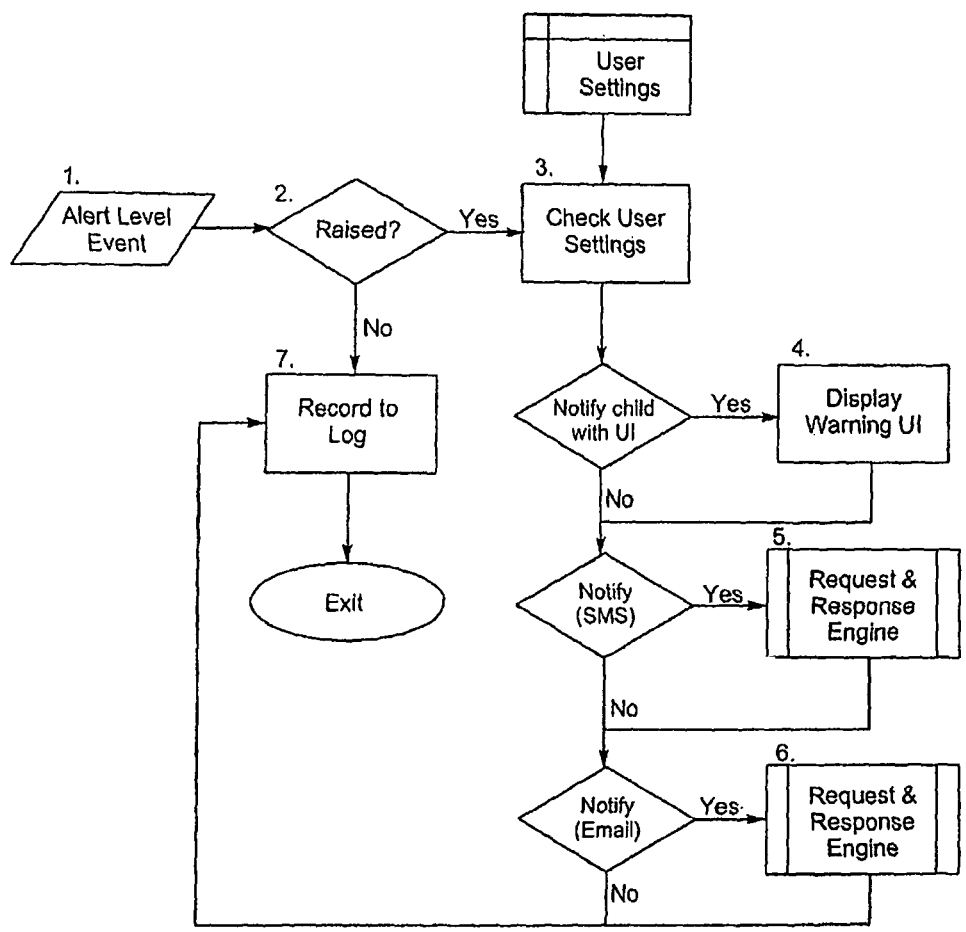
FIG. 5 is a flow chart of a security warning engine in accordance with a preferred embodiment of the present invention.
Figure 6:
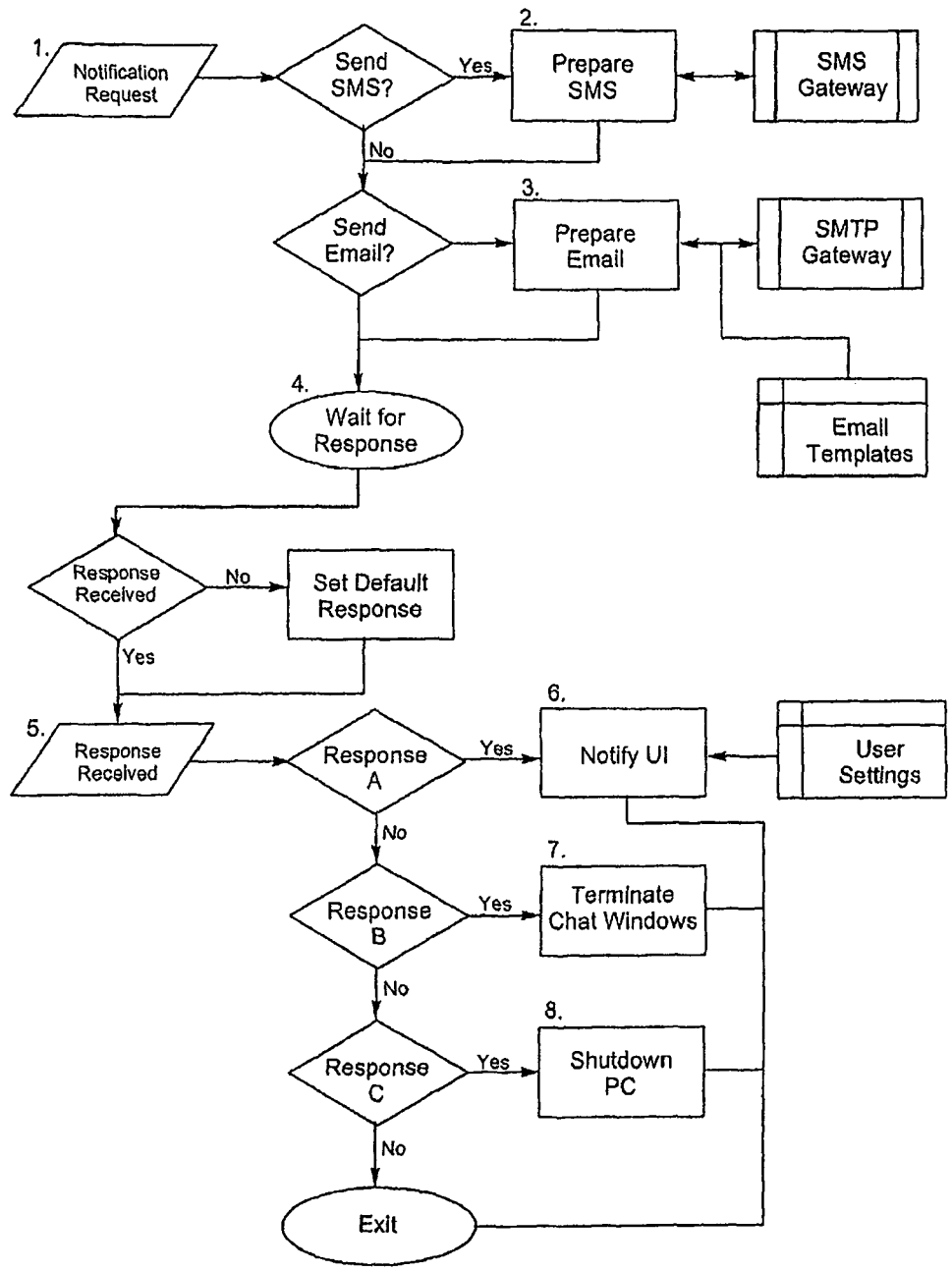
FIG. 6 is a flow chart of a request and response engine in accordance with a preferred embodiment of the present invention.

The security warning algorithm has a series of actions it may perform in real time and vary as the data gathered grows (or shrinks). For example if a security warning level of "medium" is reached, the next security state could be either "low" or "high". Since the data is continual, the levels (or states) need to increase and decrease over time. In addition when an action by the administrator has occurred, the security warning algorithm may match the action with a corresponding appropriate state. An algorithm that basically controls all the states of the software with respect to the Security Warning Algorithm can be best described by the flowchart of FIG. 5. The security warnings main function is to notify the child and parent that something suspicious has occurred. Delivery systems for these notifications can vary based on the settings the parent chooses in the user interface. These delivery types can vary from SMS notification to a simple popup in the bottom of the screen of the user's terminal. Regardless of the type of delivery system used the parent is always made aware of the severity of the alert in order to best help them make an informed response. The steps of the flow chart of FIG. 5 are numbered as follows:

1. An alert level has been raised by the matching & categorizing engine.
2. In addition to the alert levels maintained by the matching & categorizing engine the security warning engine also maintains its own internal alert level monitoring system. This alert level is updated to match the last alert level raised by the matching & categorizing engine. If the alert level raised has decreased since the last alert then proceed to 7. Alternatively if the alert just raised is higher than the previous alert then proceed to 3.
3. Settings specified by the parent are loaded into memory. These settings may include contact email addresses and SMS phone numbers, as well as preferences for how the parent would like to receive said notification.
4. If the parent has specified that the child is to be notified then a 3D character is loaded on screen and delivers a message (also specified by the parent through the user interface) to the child.
5. If the parent has requested to be sent an SMS then their preferred telephone number is sent to the request and response engine for processing.
6. If the parent has requested to be send an Email then their preferred email address is sent to the request and response engine for processing.
7. The details describing the alert level are recorded to an XML log file which can be reviewed at a later date by the parents through the user interface.

The Request and Response Engine:

The request and response engine is responsible for presenting a request for the administrator to act upon. For example, the software security warning algorithm can prepare a state of "high" and feed this through to the request and response engine (e.g. via SMS gateway). The request and response engine may then initiate a request to the administrator. The administrator can enact an action, such as, "shut computer down", and send back a response. The request and response engine then may capture the administrator's response and enact on it (e.g. the computer is shut down). The Request and Response Engine can be best described by the flowchart of FIG. 6. The job of the request and response engine is to deliver outgoing alerts to the parent and await their response (if any).

1. A notification request arrives from the security warning engine.
2. If the notification request stipulates an SMS is to be sent then an SMS text is created and sent to the external SMS gateway. This gateway may be maintained by an external $3^{rd}$ party provider.
3. If the notification request stipulates an Email is to be sent then a predefined email template is loaded and forwarded to the SMTP gateway for sending.
4. At this point the request and response engine sets a timer for 5 minutes. During this period it waits for a response to arrive from the parent from either the SMS or the email that was sent out. Should the parent not respond within a window of preferably 5 minutes the request and response engine is programmed to proceed with a default response. This default response may be maintainable by the parent through the user interface.
5. A response is received, be it from the parent or a default response. The response comes in the form of a single ASCII character, A, B or C. Each one of these representing a specific action. A=Alert, B=Block, C=Computer.
6. If the response was of type A then the child is notified again by the 3D character. The message delivered by the character is configurable by the parents through the user interface.
7. If the response was of type B then the monitoring system may terminate the child's current internet chat session.
8. If the response was of type C then the monitoring system may shut the computer down. The child is given a 30 second warning so that they may close any other applications they may have open (eg. Microsoft Word) and save any work they may have been doing.

This point completes the workflow process and it may be continuously repeated while the application is running and the computer is receiving incoming network or other communication traffic.

The System Log Engine:

The system log engine is responsible for logging all:
(a) "significant" data;
(b) data communication identifiers;
(c) changes in states; and
(d) actions.

These logs are able to analysed to produce statistical information. This data can also be imported into a reporting engine for further formatting and analysis.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

APPENDIX A

Sample Dictionary

```
<?xml version," 1.0" ?>
- <DictionaryCategories>
 - <Suggestive>
  -<High>
   - <General>
    <Phrase>I can</Phrase>
    <Phrase>ill</Phrase>
   </General>
   <Affection />
   <Drugs />
   - <Meeting>
    <Phrase>come ova</Phrase>
    <Phrase>come over</Phrase>
    <Phrase>cum ova</Phrase>
    <Phrase>ova</Phrase>
    <Phrase>over</Phrase>
    <Phrase>wanna</Phrase>
    <Phrase>want to</Phrase>
    <Phrase>when do</Phrase>
   </Meeting>
   <Family />
   - <Sex>
    <Phrase>oral</Phrase>
    <Phrase>orgasm</Phrase>
    <Phrase>orgazm</Phrase>
    <Phrase>orgy</Phrase>
    <Phrase>virgin</Phrase>
    <Phrase>wear</Phrase>
   </Sex>
   <Stalking />
   <Bullying />
  </High>
  - <Medium>
   - <General>
```

APPENDIX A-continued

Sample Dictionary

```
    <Phrase>bash</Phrase>
    <Phrase>cam 2 cam</Phrase>
    <Phrase>cam to cam</Phrase>
    <Phrase>camera 2 camera</Phrase>
    <Phrase>camera to camera</Phrase>
    <Phrase>do you</Phrase>
    <Phrase>how u</Phrase>
    <Phrase>how you</Phrase>
    <Phrase>hve u</Phrase>
    <Phrase>hw do</Phrase>
    <Phrase>I am</Phrase>
    <Phrase>I do</Phrase>
    <Phrase>I get</Phrase>
    <Phrase>I take</Phrase>
    <Phrase>is ur</Phrase>
    <Phrase>is ya</Phrase>
    <Phrase>is your</Phrase>
    <Phrase>is yr</Phrase>
    <Phrase>know many</Phrase>
    <Phrase>let me</Phrase>
    <Phrase>Parent Over Shoulder</Phrase>
    <Phrase>Parents are watching</Phrase>
    <Phrase>parents c</Phrase>
    <Phrase>parents know</Phrase>
    <Phrase>parents see</Phrase>
    <Phrase>PAW </Phrase>
    <Phrase>People are watching</Phrase>
    <Phrase>POS</Phrase>
    <Phrase>u cant</Phrase>
    <Phrase>wan2</Phrase>
    <Phrase>want 2</Phrase>
    <Phrase>where u</Phrase>
    <Phrase>where you</Phrase>
    <Phrase>why won</Phrase>
    <Phrase>why wont</Phrase>
    <Phrase>wish I</Phrase>
    <Phrase>y won</Phrase>
    <Phrase>y wont</Phrase>
   </General>
   <Affection />
   <Drugs />
   - <Meeting>
    <Phrase>away</Phrase>
    <Phrase>fanc</Phrase>
    <Phrase>fancy</Phrase>
    <Phrase>gimmie</Phrase>
    <Phrase>give me</Phrase>
    <Phrase>go on</Phrase>
    <Phrase>holiday</Phrase>
    <Phrase>with me</Phrase>
   </Meeting>
   <Family />
   - <Sex>
    <Phrase>a hard</Phrase>
    <Phrase>ambisexual</Phrase>
    <Phrase>brains out</Phrase>
     <Phrase>deep throat</Phrase>
     <Phrase>dick</Phrase>
     <Phrase>dik</Phrase>
     <Phrase>dildo</Phrase>
     <Phrase>dominate</Phrase>
     <Phrase>erecshun</Phrase>
     <Phrase>erection</Phrase>
    <Phrase>erekshun</Phrase>
    <Phrase>gay</Phrase>
    <Phrase>horny</Phrase>
    <Phrase>hot 4</Phrase>
    <Phrase>hot for</Phrase>
    <Phrase>hot4</Phrase>
    <Phrase>hotfor</Phrase>
    <Phrase>hotluv</Phrase>
    <Phrase>hrny</Phrase>
    <Phrase>sck</Phrase>
    <Phrase>sex</Phrase>
    <Phrase>sexx</Phrase>
    <Phrase>sexxx</Phrase>
    <Phrase>sexy</Phrase>
    <Phrase>sit on</Phrase>
```

APPENDIX A-continued

Sample Dictionary

```
<Phrase>sixty niner</Phrase>
<Phrase>sixtyniner</Phrase>
<Phrase>sleep with</Phrase>
<Phrase>sleep wiv</Phrase>
<Phrase>threesome</Phrase>
    </Sex>
<Stalking />
<Bullying />
    </Medium>
- <Low>
  - <General>
<Phrase>are ur</Phrase>
<Phrase>are ya</Phrase>
<Phrase>are you</Phrase>
<Phrase>are your</Phrase>
<Phrase>are yr</Phrase>
<Phrase>are yur</Phrase>
<Phrase>av u</Phrase>
<Phrase>ave u</Phrase>
<Phrase>aveu</Phrase>
<Phrase>b a</Phrase>
<Phrase>b/f</Phrase>
<Phrase>be a</Phrase>
<Phrase>beg 4</Phrase>
<Phrase>beg for</Phrase>
<Phrase>beg four</Phrase>
<Phrase>bf</Phrase>
<Phrase>can I</Phrase>
<Phrase>can you</Phrase>
<Phrase>can your</Phrase>
<Phrase>describe</Phrase>
<Phrase>do u</Phrase>
<Phrase>do ya</Phrase>
<Phrase>do you</Phrase>
<Phrase>do your</Phrase>
    <Phrase>dya</Phrase>
    <Phrase>dya av</Phrase>
    <Phrase>dya have</Phrase>
    <Phrase>eva ad</Phrase>
    <Phrase>eva do</Phrase>
    <Phrase>eva tried</Phrase>
    <Phrase>eva tryed</Phrase>
    <Phrase>ever do</Phrase>
    <Phrase>ever tried</Phrase>
    <Phrase>ever tryed</Phrase>
    <Phrase>fanny</Phrase>
    <Phrase>film us</Phrase>
    <Phrase>g/f</Phrase>
    <Phrase>gonna</Phrase>
    <Phrase>good</Phrase>
    <Phrase>got a</Phrase>
    <Phrase>gr8</Phrase>
    <Phrase>great</Phrase>
    <Phrase>hard</Phrase>
    <Phrase>have a</Phrase>
    <Phrase>have any</Phrase>
    <Phrase>have many</Phrase>
    <Phrase>have u</Phrase>
    <Phrase>haveu</Phrase>
    <Phrase>i am</Phrase>
    <Phrase>i are</Phrase>
    <Phrase>I can</Phrase>
    <Phrase>I could</Phrase>
    <Phrase>i do</Phrase>
    <Phrase>I got</Phrase>
    <Phrase>I have</Phrase>
    <Phrase>I kno</Phrase>
    <Phrase>I know</Phrase>
    <Phrase>I need</Phrase>
    <Phrase>I wan</Phrase>
    <Phrase>i wanna</Phrase>
    <Phrase>I want</Phrase>
    <Phrase>I will</Phrase>
    <Phrase>i wont</Phrase>
    <Phrase>i would</Phrase>
    <Phrase>is your</Phrase>
    <Phrase>like</Phrase>
    <Phrase>love</Phrase>
    <Phrase>lover</Phrase>
    <Phrase>luv</Phrase>
    <Phrase>lvr</Phrase>
    <Phrase>phone</Phrase>
    <Phrase>pics</Phrase>
    <Phrase>picture</Phrase>
    <Phrase>pop</Phrase>
<Phrase>pose</Phrase>
<Phrase>r u</Phrase>
<Phrase>r your</Phrase>
<Phrase>r yr</Phrase>
<Phrase>ru @</Phrase>
<Phrase>same room</Phrase>
<Phrase>talk</Phrase>
<Phrase>teach</Phrase>
<Phrase>u am</Phrase>
<Phrase>u are</Phrase>
<Phrase>u can</Phrase>
<Phrase>u could</Phrase>
<Phrase>u do</Phrase>
<Phrase>u have</Phrase>
<Phrase>u wanna</Phrase>
<Phrase>u want</Phrase>
<Phrase>u wont</Phrase>
<Phrase>u would</Phrase>
<Phrase>W @ r</Phrase>
<Phrase>w@s d</Phrase>
<Phrase>w@s the</Phrase>
<Phrase>w@s ur</Phrase>
<Phrase>w@s ya</Phrase>
<Phrase>we are</Phrase>
<Phrase>we could</Phrase>
<Phrase>we do</Phrase>
<Phrase>we have</Phrase>
<Phrase>we would</Phrase>
<Phrase>what sort</Phrase>
<Phrase>what srt</Phrase>
<Phrase>whats d</Phrase>
<Phrase>whats the</Phrase>
<Phrase>whats your</Phrase>
<Phrase>where u</Phrase>
<Phrase>where you</Phrase>
<Phrase>whos @</Phrase>
<Phrase>whos @home</Phrase>
<Phrase>whos at</Phrase>
<Phrase>whos d</Phrase>
<Phrase>whos in</Phrase>
<Phrase>whos the</Phrase>
<Phrase>whos ur</Phrase>
<Phrase>whos your</Phrase>
<Phrase>will you</Phrase>
<Phrase>will your</Phrase>
<Phrase>would u</Phrase>
<Phrase>would you</Phrase>
<Phrase>wouldu</Phrase>
<Phrase>wouldyou</Phrase>
<Phrase>you am</Phrase>
    <Phrase>you are</Phrase>
    <Phrase>you can</Phrase>
    <Phrase>you could</Phrase>
    <Phrase>you do</Phrase>
    <Phrase>you have</Phrase>
    <Phrase>you wanna</Phrase>
    <Phrase>you want</Phrase>
    <Phrase>you wont</Phrase>
    <Phrase>you would</Phrase>
        </General>
    <Affection />
    <Drugs />
  - <Meeting>
    <Phrase>c u</Phrase>
    <Phrase>do u</Phrase>
    <Phrase>live</Phrase>
    <Phrase>wots</Phrase>
        </Meeting>
    <Family />
  - <Sex>
    <Phrase>beat</Phrase>
```

APPENDIX A-continued

Sample Dictionary

```
            <Phrase>biatch</Phrase>
            <Phrase>bisexual</Phrase>
            <Phrase>bitch</Phrase>
            <Phrase>bondage</Phrase>
            <Phrase>bonking</Phrase>
            <Phrase>boobs</Phrase>
            <Phrase>dirty</Phrase>
            <Phrase>kinky</Phrase>
            <Phrase>naked</Phrase>
            <Phrase>nekkid</Phrase>
          </Sex>
          <Stalking />
          <Bullying />
            </Low>
        </Suggestive>
   - <Emotions>
     - <High>
       - <General>
            <Phrase>dislike</Phrase>
            <Phrase>h8</Phrase>
            <Phrase>hate</Phrase>
            <Phrase>haten</Phrase>
            <Phrase>hatin</Phrase>
            <Phrase>hating</Phrase>
            <Phrase>lov</Phrase>
            <Phrase>love</Phrase>
            <Phrase>love u</Phrase>
            <Phrase>love you</Phrase>
            <Phrase>luv</Phrase>
          </General>
   - <Affection>
          <Phrase>luv you</Phrase>
          </Affection>
          <Drugs />
          <Meeting />
          <Family />
          <Sex />
          <Stalking />
          <Bullying />
        </High>
   - <Medium>
     - <General>
          <Phrase>alone</Phrase>
          <Phrase>angry</Phrase>
          <Phrase>fancy</Phrase>
          <Phrase>tove</Phrase>
          <Phrase>my fav</Phrase>
          <Phrase>my fave</Phrase>
          <Phrase>my favourite</Phrase>
          <Phrase>safe</Phrase>
          </General>
   - <Affection>
          <Phrase>(l)</Phrase>
          <Phrase>care about</Phrase>
          <Phrase>luv</Phrase>
          </Affection>
          <Drugs />
          <Meeting />
          <Family />
          <Sex />
          <Stalking />
          <Bullying />
        </Medium>
   - <Low>
     - <General>
          <Phrase>happy</Phrase>
          <Phrase>like</Phrase>
          <Phrase>likein</Phrase>
          <Phrase>liken</Phrase>
          <Phrase>likin</Phrase>
          <Phrase>liking</Phrase>
          <Phrase>lonely</Phrase>
          <Phrase>sad</Phrase>
          </General>
          <Affection />
          <Drugs />
          <Meeting />
          <Family />
          <Sex />
          <Stalking />
          <Bullying />
            </Low>
          </Emotions>
   - <Actions>
     - <High>
       - <General>
          <Phrase>4 ur eyes</Phrase>
          <Phrase>4 ya eyes</Phrase>
          <Phrase>CU2NITE @ YaPLAc</Phrase>
          <Phrase>fight</Phrase>
          <Phrase>get me</Phrase>
          <Phrase>get on</Phrase>
          <Phrase>get u</Phrase>
          <Phrase>get you</Phrase>
          <Phrase>stay out</Phrase>
          </General>
     - <Affection>
          <Phrase>aliwanisu</Phrase>
          <Phrase>DoUWanMe</Phrase>
          <Phrase>fallin in love</Phrase>
          <Phrase>fallin in luv</Phrase>
          <Phrase>falling in love</Phrase>
          <Phrase>falling in luv</Phrase>
          <Phrase>on ur own</Phrase>
          <Phrase>on ya own</Phrase>
          </Affection>
   - <Drugs>
          <Phrase>f**ked</Phrase>
          <Phrase>mashed</Phrase>
          <Phrase>pop</Phrase>
          <Phrase>smashed</Phrase>
          <Phrase>smoke</Phrase>
          <Phrase>stoned</Phrase>
          <Phrase>take</Phrase>
          <Phrase>toke</Phrase>
          <Phrase>trip</Phrase>
          </Drugs>
   - <Meeting>
          <Phrase>meet</Phrase>
          <Phrase>play</Phrase>
          <Phrase>stay</Phrase>
          </Meeting>
          <Family />
   - <Sex>
          <Phrase>angry dragon</Phrase>
          <Phrase>cyba</Phrase>
          <Phrase>cyber</Phrase>
          <Phrase>cybr</Phrase>
          <Phrase>fark</Phrase>
        <Phrase>fcuk</Phrase>
        <Phrase>fist</Phrase>
        <Phrase>fuc</Phrase>
        <Phrase>f**k</Phrase>
        <Phrase>fuk</Phrase>
        <Phrase>golden shower</Phrase>
        <Phrase>pissd</Phrase>
        <Phrase>pissed</Phrase>
        <Phrase>rape</Phrase>
        <Phrase>role play</Phrase>
        <Phrase>roleplay</Phrase>
        <Phrase>roman shower</Phrase>
        <Phrase>satisfy</Phrase>
        <Phrase>seat</Phrase>
        <Phrase>sex</Phrase>
        <Phrase>shag</Phrase>
        <Phrase>shavd</Phrase>
        <Phrase>shaved</Phrase>
        <Phrase>shaven</Phrase>
        <Phrase>shavn</Phrase>
        <Phrase>s**t</Phrase>
        <Phrase>slave</Phrase>
        <Phrase>spank</Phrase>
        <Phrase>stink fist</Phrase>
        <Phrase>strip</Phrase>
        <Phrase>stroke</Phrase>
        <Phrase>s**k</Phrase>
```

APPENDIX A-continued

Sample Dictionary

```xml
            <Phrase>swallow</Phrase>
            <Phrase>sx</Phrase>
            <Phrase>wank</Phrase>
            <Phrase>whip</Phrase>
            <Phrase>whipp</Phrase>
            <Phrase>wnk</Phrase>
            <Phrase>xxx</Phrase>
        </Sex>
        <Stalking>
            <Phrase>escape me</Phrase>
            <Phrase>escpae</Phrase>
            <Phrase>find</Phrase>
            <Phrase>follow</Phrase>
            <Phrase>get away</Phrase>
            <Phrase>run away</Phrase>
            <Phrase>watch</Phrase>
        </Stalking>
        <Bullying>
            <Phrase>bash</Phrase>
            <Phrase>destroy</Phrase>
            <Phrase>kill</Phrase>
            <Phrase>murder</Phrase>
            <Phrase>stab</Phrase>
        </Bullying>
    </High>
    <Medium>
        <General>
            <Phrase>buy me</Phrase>
            <Phrase>buy u</Phrase>
            <Phrase>buy you</Phrase>
            <Phrase>c me</Phrase>
            <Phrase>call</Phrase>
            <Phrase>contact</Phrase>
            <Phrase>DntMAkMeWAt2Lng</Phrase>
            <Phrase>dont let</Phrase>
            <Phrase>dont show</Phrase>
            <Phrase>dont tell</Phrase>
            <Phrase>drive</Phrase>
            <Phrase>kam 2 kam</Phrase>
            <Phrase>kam to kam</Phrase>
            <Phrase>kam2kam</Phrase>
            <Phrase>kamtokam</Phrase>
            <Phrase>let u</Phrase>
            <Phrase>look after</Phrase>
            <Phrase>pay 4</Phrase>
            <Phrase>pierce</Phrase>
            <Phrase>piercing</Phrase>
            <Phrase>ring</Phrase>
            <Phrase>shoppin</Phrase>
            <Phrase>shopping</Phrase>
            <Phrase>spend</Phrase>
            <Phrase>take care ov u</Phrase>
            <Phrase>together</Phrase>
            <Phrase>txt me back</Phrase>
            <Phrase>txt me bak</Phrase>
            <Phrase>up for it</Phrase>
            <Phrase>watch</Phrase>
            <Phrase>work</Phrase>
        </General>
        <Affection>
            <Phrase>(k)</Phrase>
            <Phrase>(L)</Phrase>
            <Phrase>:-x</Phrase>
            <Phrase>big kiss</Phrase>
            <Phrase>cuddle</Phrase>
            <Phrase>fallin 4 u</Phrase>
            <Phrase>fallin for u</Phrase>
            <Phrase>falling 4 u</Phrase>
            <Phrase>falling for u</Phrase>
            <Phrase>falling for you</Phrase>
            <Phrase>hld u</Phrase>
            <Phrase>hold u</Phrase>
            <Phrase>hugs and kisses</Phrase>
            <Phrase>hugs n kisses</Phrase>
            <Phrase>hugs n xxxxs</Phrase>
            <Phrase>liv d dream</Phrase>
            <Phrase>liv d drm</Phrase>
        </Affection>
        <Drugs>
            <Phrase>drink</Phrase>
        </Drugs>
        <Meeting>
            <Phrase>come</Phrase>
            <Phrase>come & look</Phrase>
            <Phrase>come & see</Phrase>
            <Phrase>come + cu</Phrase>
            <Phrase>come + look</Phrase>
            <Phrase>come and see</Phrase>
            <Phrase>come n look</Phrase>
            <Phrase>contact</Phrase>
            <Phrase>meet</Phrase>
            <Phrase>see</Phrase>
            <Phrase>seek</Phrase>
            <Phrase>take</Phrase>
        </Meeting>
        <Family>
            <Phrase>4 a living</Phrase>
            <Phrase>for a living</Phrase>
        </Family>
        <Sex>
            <Phrase>3some</Phrase>
            <Phrase>3sum</Phrase>
            <Phrase>anal</Phrase>
            <Phrase>analingus</Phrase>
            <Phrase>bang</Phrase>
            <Phrase>carpet much</Phrase>
            <Phrase>cum</Phrase>
            <Phrase>f u c k</Phrase>
            <Phrase>f uck</Phrase>
            <Phrase>face</Phrase>
            <Phrase>fck</Phrase>
            <Phrase>fcuk</Phrase>
            <Phrase>feel</Phrase>
            <Phrase>fellate</Phrase>
            <Phrase>fellatio</Phrase>
            <Phrase>fetish</Phrase>
            <Phrase>finga</Phrase>
            <Phrase>finger</Phrase>
            <Phrase>foreplay</Phrase>
            <Phrase>fuc</Phrase>
            <Phrase>fuk</Phrase>
            <Phrase>gag</Phrase>
            <Phrase>gagg</Phrase>
                <Phrase>gang bang</Phrase>
                <Phrase>gangbang</Phrase>
                <Phrase>kummin</Phrase>
            <Phrase>laid</Phrase>
            <Phrase>lck</Phrase>
            <Phrase>lick</Phrase>
            <Phrase>rub</Phrase>
            <Phrase>s**k</Phrase>
            <Phrase>tlk</Phrase>
            <Phrase>touch</Phrase>
        </Sex>
        <Stalking>
            <Phrase>listen</Phrase>
        </Stalking>
        <Bullying>
            <Phrase>kick</Phrase>
            <Phrase>punch</Phrase>
        </Bullying>
    </Medium>
    <Low>
        <General>
            <Phrase>(e)</Phrase>
            <Phrase>babysit</Phrase>
            <Phrase>blow</Phrase>
            <Phrase>cum</Phrase>
            <Phrase>drink</Phrase>
            <Phrase>eat</Phrase>
            <Phrase>finger</Phrase>
            <Phrase>flick</Phrase>
            <Phrase>fone</Phrase>
            <Phrase>get</Phrase>
            <Phrase>give me</Phrase>
            <Phrase>give you</Phrase>
```

APPENDIX A-continued

Sample Dictionary

```
            <Phrase>go to</Phrase>
            <Phrase>keep</Phrase>
            <Phrase>lick</Phrase>
            <Phrase>look</Phrase>
            <Phrase>piss</Phrase>
            <Phrase>play</Phrase>
            <Phrase>pull</Phrase>
            <Phrase>rub</Phrase>
            <Phrase>speak</Phrase>
            <Phrase>spit</Phrase>
            <Phrase>talk</Phrase>
            <Phrase>tickle</Phrase>
            <Phrase>tlk</Phrase>
            <Phrase>touch</Phrase>
            <Phrase>wait</Phrase>
            <Phrase>yank</Phrase>
         </General>
         <Affection>
            <Phrase>hug</Phrase>
            <Phrase>snog</Phrase>
         </Affection>
         <Drugs />
         <Meeting>
            <Phrase>bring</Phrase>
            <Phrase>eall</Phrase>
            <Phrase>hang</Phrase>
            <Phrase>moov</Phrase>
            <Phrase>mov</Phrase>
            <Phrase>ring</Phrase>
            <Phrase>speak</Phrase>
            <Phrase>spk</Phrase>
            <Phrase>talk</Phrase>
            <Phrase>text</Phrase>
            <Phrase>txt</Phrase>
         </Meeting>
         <Family />
         <Sex />
         <Stalking />
         <Bullying />
      </Low>
   </Actions>
   <Linking>
      <High>
         <General>
            <Phrase>get you</Phrase>
         </General>
         <Affection />
         <Drugs />
         <Meeting />
         <Family />
         <Sex />
         <Stalking />
         <Bullying />
      </High>
      <Medium>
         <General>
            <Phrase>you more</Phrase>
         </General>
         <Affection />
         <Drugs />
         <Meeting />
         <Family />
         <Sex />
         <Stalking />
         <Bullying />
      </Medium>
      <Low>
         <General>
            <Phrase>are u</Phrase>
            <Phrase>her</Phrase>
            <Phrase>his</Phrase>
            <Phrase>me</Phrase>
            <Phrase>my</Phrase>
            <Phrase>myself</Phrase>
            <Phrase>our</Phrase>
            <Phrase>pls</Phrase>
            <Phrase>u</Phrase>
            <Phrase>u like</Phrase>
            <Phrase>ulike</Phrase>
            <Phrase>u'll</Phrase>
            <Phrase>ur</Phrase>
            <Phrase>wan2</Phrase>
            <Phrase>wanna</Phrase>
            <Phrase>want 2</Phrase>
            <Phrase>want to</Phrase>
            <Phrase>ya</Phrase>
            <Phrase>you</Phrase>
            <Phrase>you'll</Phrase>
            <Phrase>your</Phrase>
            <Phrase>yr</Phrase>
         </General>
         <Affection />
         <Drugs />
         <Meeting />
         <Family />
         <Sex />
         <Stalking />
         <Bullying />
      </Low>
   </Linking>
   <Objects>
      <High>
         <General>
            <Phrase>b@nk number</Phrase>
            <Phrase>bank #</Phrase>
            <Phrase>bank account no</Phrase>
            <Phrase>bank account num</Phrase>
            <Phrase>bank account number</Phrase>
            <Phrase>bank details</Phrase>
            <Phrase>bank no</Phrase>
            <Phrase>bank num</Phrase>
            <Phrase>bank number</Phrase>
            <Phrase>bed</Phrase>
            <Phrase>bnk number</Phrase>
            <Phrase>boyfriend</Phrase>
            <Phrase>credit card</Phrase>
            <Phrase>cubs leader</Phrase>
         <Phrase>pin no</Phrase>
         <Phrase>pin num</Phrase>
         <Phrase>pin number</Phrase>
         <Phrase>school</Phrase>
         </General>
         <Affection />
         <Drugs>
            <Phrase>acid</Phrase>
            <Phrase>alcohol</Phrase>
            <Phrase>amies</Phrase>
            <Phrase>anphetamine</Phrase>
            <Phrase>beer</Phrase>
            <Phrase>charlie</Phrase>
            <Phrase>cigarettes</Phrase>
            <Phrase>cocaine</Phrase>
            <Phrase>coke</Phrase>
            <Phrase>downers</Phrase>
            <Phrase>drugs</Phrase>
            <Phrase>ecstacy</Phrase>
            <Phrase>ectasy</Phrase>
            <Phrase>gin</Phrase>
            <Phrase>hash</Phrase>
            <Phrase>heroin</Phrase>
            <Phrase>moggies</Phrase>
            <Phrase>pills</Phrase>
            <Phrase>speed</Phrase>
            <Phrase>trips</Phrase>
            <Phrase>uppers</Phrase>
            <Phrase>vodka</Phrase>
            <Phrase>weed</Phrase>
            <Phrase>whisky</Phrase>
            <Phrase>whizz</Phrase>
            <Phrase>wine</Phrase>
            <Phrase>wiz</Phrase>
         </Drugs>
         <Meeting>
            <Phrase>(au)</Phrase>
            <Phrase>car</Phrase>
            <Phrase>da night</Phrase>
```

APPENDIX A-continued

Sample Dictionary

```xml
            <Phrase>football</Phrase>
            <Phrase>hotel</Phrase>
            <Phrase>my place</Phrase>
            <Phrase>netball</Phrase>
            <Phrase>night</Phrase>
            <Phrase>rugby</Phrase>
            <Phrase>soccer</Phrase>
            <Phrase>tennis</Phrase>
            <Phrase>ur home</Phrase>
            <Phrase>ur place</Phrase>
            <Phrase>your home</Phrase>
                <Phrase>your place</Phrase>
                    </Meeting>
                - <Family>
                <Phrase>children</Phrase>
                    </Family>
                - <Sex>
            <Phrase>arse</Phrase>
            <Phrase>ass</Phrase>
            <Phrase>balls</Phrase>
            <Phrase>breast</Phrase>
            <Phrase>breasts</Phrase>
            <Phrase>cock</Phrase>
            <Phrase>c**t</Phrase>
            <Phrase>dick</Phrase>
            <Phrase>dildo</Phrase>
            <Phrase>f**khole</Phrase>
            <Phrase>fun bag</Phrase>
            <Phrase>nippl</Phrase>
            <Phrase>nipple</Phrase>
            <Phrase>nut</Phrase>
            <Phrase>nuts</Phrase>
            <Phrase>penile</Phrase>
            <Phrase>penis</Phrase>
            <Phrase>pink bit</Phrase>
            <Phrase>pink bits</Phrase>
            <Phrase>piss flaps</Phrase>
            <Phrase>pissflaps</Phrase>
            <Phrase>porn</Phrase>
            <Phrase>pr0n</Phrase>
            <Phrase>prick</Phrase>
            <Phrase>pubes</Phrase>
            <Phrase>pubic</Phrase>
            <Phrase>pussy</Phrase>
            <Phrase>sextoys</Phrase>
            <Phrase>tit</Phrase>
            <Phrase>tits</Phrase>
            <Phrase>vibrator</Phrase>
            <Phrase>vibro</Phrase>
            <Phrase>willie</Phrase>
            <Phrase>willy</Phrase>
                </Sex>
            <Stalking />
            <Bullying />
                </High>
            - <Medium>
            - <General>
                <Phrase>(~)</Phrase>
                <Phrase>(g)</Phrase>
                <Phrase>akela</Phrase>
                <Phrase>allowance</Phrase>
            <Phrase>bday</Phrase>
            <Phrase>birthday</Phrase>
            <Phrase>boss</Phrase>
            <Phrase>concert</Phrase>
            <Phrase>favourite place</Phrase>
            <Phrase>favrit place</Phrase>
            <Phrase>fotos</Phrase>
            <Phrase>frend</Phrase>
            <Phrase>frenz</Phrase>
            <Phrase>friends</Phrase>
            <Phrase>gift</Phrase>
            <Phrase>head</Phrase>
            <Phrase>high</Phrase>
            <Phrase>hole</Phrase>
            <Phrase>how old</Phrase>
            <Phrase>jewellery</Phrase>
            <Phrase>mine 4e</Phrase>
            <Phrase>mine 4eva</Phrase>
            <Phrase>mine forever</Phrase>
            <Phrase>money</Phrase>
            <Phrase>photos</Phrase>
            <Phrase>pic</Phrase>
            <Phrase>picture</Phrase>
            <Phrase>pill</Phrase>
            <Phrase>pills</Phrase>
            <Phrase>pix</Phrase>
            <Phrase>pocket $</Phrase>
            <Phrase>pocket £</Phrase>
            <Phrase>pocket money</Phrase>
            <Phrase>sec no</Phrase>
            <Phrase>sec num</Phrase>
            <Phrase>secret</Phrase>
            <Phrase>security number</Phrase>
            <Phrase>single</Phrase>
            <Phrase>special place</Phrase>
            <Phrase>webcam</Phrase>
            <Phrase>youth club</Phrase>
                </General>
            - <Affection>
                <Phrase>1 4 me</Phrase>
                <Phrase>gorgeous</Phrase>
                <Phrase>relationship</Phrase>
                <Phrase>u + me</Phrase>
                <Phrase>u n me</Phrase>
                </Affection>
            - <Drugs>
                <Phrase>booze</Phrase>
                </Drugs>
            - <Meeting>
                <Phrase>skool</Phrase>
                    </Meeting>
                - <Family>
                <Phrase>@ home</Phrase>
                <Phrase>@ ome</Phrase>
                <Phrase>2gether</Phrase>
                <Phrase>anyone at home</Phrase>
                <Phrase>anyone else home</Phrase>
                <Phrase>at home</Phrase>
                    </Family>
                - <Sex>
                <Phrase>axe wound</Phrase>
                <Phrase>balls</Phrase>
                <Phrase>cck</Phrase>
                <Phrase>cherry</Phrase>
                <Phrase>circumcised</Phrase>
                <Phrase>clit</Phrase>
                <Phrase>clitt</Phrase>
                <Phrase>cock</Phrase>
                <Phrase>condom</Phrase>
                <Phrase>cum</Phrase>
                <Phrase>c**t</Phrase>
                <Phrase>foreskin</Phrase>
                <Phrase>furry cup</Phrase>
                <Phrase>horny</Phrase>
                <Phrase>sex on legs</Phrase>
                    </Sex>
            <Stalking />
            <Bullying />
                </Medium>
            - <Low>
            - <General>
                <Phrase>(*_*)</Phrase>
                <Phrase>(P)</Phrase>
                <Phrase>bag</Phrase>
                <Phrase>baggy clothes</Phrase>
                <Phrase>bean</Phrase>
                <Phrase>beautiful</Phrase>
                <Phrase>blazer</Phrase>
                <Phrase>but</Phrase>
                <Phrase>club</Phrase>
                <Phrase>crackin</Phrase>
                <Phrase>cracking</Phrase>
                <Phrase>cutie</Phrase>
                <Phrase>foto</Phrase>
                <Phrase>fotograph</Phrase>
```

APPENDIX A-continued

Sample Dictionary

```xml
      <Phrase>green</Phrase>
      <Phrase>handsome</Phrase>
      <Phrase>lingerie</Phrase>
      <Phrase>log</Phrase>
      <Phrase>people</Phrase>
  <Phrase>pet</Phrase>
  <Phrase>photo</Phrase>
  <Phrase>photograph</Phrase>
  <Phrase>pic</Phrase>
  <Phrase>picture</Phrase>
  <Phrase>pix</Phrase>
  <Phrase>pole</Phrase>
  <Phrase>present</Phrase>
  <Phrase>pressie</Phrase>
  <Phrase>pretty</Phrase>
  <Phrase>prezzy</Phrase>
  <Phrase>sausage</Phrase>
  <Phrase>sc%l</Phrase>
  <Phrase>school</Phrase>
  <Phrase>skate cltohes</Phrase>
  <Phrase>skirt</Phrase>
  <Phrase>skool</Phrase>
  <Phrase>taco</Phrase>
  <Phrase>team</Phrase>
  <Phrase>tie</Phrase>
  <Phrase>trousers</Phrase>
  <Phrase>uniform</Phrase>
  <Phrase>waffle</Phrase>
      </General>
  <Affection />
  <Drugs />
 - <Meeting>
      <Phrase>address</Phrase>
      <Phrase>email</Phrase>
      <Phrase>e-mail</Phrase>
      <Phrase>face</Phrase>
      <Phrase>fone</Phrase>
      <Phrase>mob #</Phrase>
      <Phrase>mob no</Pbrase>
      <Phrase>mobile</Phra se>
      <Phrase>moby</Phrase>
      <Phrase>outside</Phrase>
      <Phrase>parents</Phrase>
      <Phrase>phone</Phrase>
      <Phrase>place</Phrase>
      <Phrase>somewhere</Phrase>
      <Phrase>sumwhere</Pbrase>
      <Phrase>tel</Phrase>
      <Phrase>tel.</Phrase>
      <Phrase>telephone #</Phrase>
      </Meeting>
  <Family />
 - <Sex>
  <Phrase>ars</Phrase>
  <Phrase>arse</Phrase>
      <Phrase>ass</Phrase>
      <Phrase>beaver</Phrase>
      <Phrase>bra</Phrase>
      <Phrase>knickas</Phrase>
      <Phrase>knickers</Phrase>
      <Phrase>knicks</Phrase>
      <Phrase>mammaries</Phrase>
      <Phrase>masturbate</Phrase>
      <Phrase>mistress</Phrase>
      <Phrase>nipples</Phrase>
      <Phrase>nude</Phrase>
         </Sex>
  <Stalking />
  <Bullying />
       </Low>
       </Objects>
  - <Roles>
  - <High>
  - <General>
      <Phrase>father</Phrase>
      <Phrase>folks</Phrase>
      <Phrase>fotographer</Phrase>
      <Phrase>girlfriend</Phrase>
      <Phrase>lil boy</Phrase>
      <Phrase>lil girl</Phrase>
      <Phrase>little boy</Phrase>
      <Phrase>little girl</Phrase>
      <Phrase>loon</Phrase>
      <Phrase>loony</Phrase>
      <Phrase>parent</Phrase>
      <Phrase>photographer</Phrase>
      <Phrase>pic taker</Phrase>
      <Phrase>picture taker</Phrase>
      <Phrase>prnts</Phrase>
      <Phrase>sick person</Phrase>
      <Phrase>young boy</Phrase>
      <Phrase>young girl</Phrase>
         </General>
  <Affection />
  <Drugs />
  <Meeting />
 - <Family>
      <Phrase>dad</Phrase>
      <Phrase>daddy</Phrase>
      <Phrase>mom</Phrase>
      <Phrase>mother</Phrase>
      <Phrase>mum</Phrase>
      <Phrase>mummy</Phrase>
      <Phrase>stepmum</Phrase>
         </Family>
 - <Sex>
  <Phrase>escort</Phrase>
  <Phrase>ho</Phrase>
  <Phrase>hooker</Phrase>
  <Phrase>nympho</Phrase>
  <Phrase>paedophile</Phrase>
  <Phrase>party girl</Phrase>
  <Phrase>pedo</Phrase>
  <Phrase>phile</Phrase>
  <Phrase>pimp</Phrase>
  <Phrase>prostitute</Phrase>
  <Phrase>slut</Phrase>
  <Phrase>stripp</Phrase>
  <Phrase>virgin</Phrase>
  <Phrase>whore</Phrase>
         </Sex>
  <Stalking />
  <Bullying />
       </High>
 - <Medium>
 - <General>
      <Phrase>aunt</Phrase>
      <Phrase>baby sitter</Phrase>
      <Phrase>babysitter</Phrase>
      <Phrase>cop</Phrase>
      <Phrase>cousin</Phrase>
      <Phrase>dad</Phrase>
      <Phrase>father</Phrase>
      <Phrase>grandad</Phrase>
      <Phrase>granma</Phrase>
      <Phrase>headmaster</Phrase>
      <Phrase>headmistress</Phrase>
      <Phrase>headteacher</Phrase>
      <Phrase>kid</Phrase>
      <Phrase>like a brother</Phrase>
      <Phrase>like a sister</Phrase>
      <Phrase>little boy</Phrase>
      <Phrase>little girl</Phrase>
      <Phrase>mother</Phra se>
      <Phrase>mum</Phrase>
      <Phrase>nan</Phrase>
      <Phrase>nanna</Phrase>
      <Phrase>policeman</Phrase>
      <Phrase>private investigator</Phrase>
      <Phrase>school boy</Phrase>
      <Phrase>school girl</Phrase>
      <Phrase>scout leader</Phrase>
      <Phrase>teacher</Phrase>
      <Phrase>uncle</Phrase>
         </General>
      <Affection />
```

APPENDIX A-continued

Sample Dictionary

```
        <Drugs />
        <Meeting />
        <Family />
        <Sex />
        <Stalking />
        <Bullying />
      </Medium>
    - <Low>
      - <General>
        <Phrase>boy</Phrase>
        <Phrase>boyf</Phrase>
        <Phrase>boyfriend</Phrase>
        <Phrase>cub leader</Phrase>
        <Phrase>cub scout</Phrase>
        <Phrase>doc</Phrase>
        <Phrase>doctor</Phrase>
        <Phrase>gf</Phrase>
        <Phrase>girl</Phrase>
        <Phrase>girl guide</Phrase>
        <Phrase>girlf</Phrase>
        <Phrase>girlfriend</Phrase>
        <Phrase>man</Phrase>
        <Phrase>nurse</Phrase>
        <Phrase>old</Phrase>
        <Phrase>scout</Phrase>
        <Phrase>scout leader</Phrase>
        <Phrase>woman</Phrase>
        <Phrase>young</Phrase>
      </General>
      <Affection />
      <Drugs />
      <Meeting />
      <Family />
      <Sex />
      <Stalking />
      <Bullying />
    </Low>
  </Roles>
  - <Acronyms>
    - <High>
      - <General>
        <Phrase>asl</Phrase>
        <Phrase>GOWM</Phrase>
      </General>
      <Affection />
      <Drugs />
      - <Meeting>
        <Phrase>MM@</Phrase>
        <Phrase>MMAMP</Phrase>
        <Phrase>wruf</Phrase>
      </Meeting>
      <Family />
      <Sex />
      <Stalking />
      <Bullying />
    </High>
    - <Medium>
      - <General>
        <Phrase>PCM</Phrase>
      </General>
      <Affection />
      <Drugs />
      <Meeting />
      <Family />
      <Sex />
      <Stalking />
      <Bullying />
    </Medium>
    - <Low>
      <General // >
      <Affection />
      <Drugs />
      - <Meeting>
        <Phrase>(t)</Phrase>
        <Phrase>d8</Phrase>
        <Phrase>f2f</Phrase>
        <Phrase>icq</Phrase>
        <Phrase>mma</Phrase>
```

```
        <Phrase>plscm</Phrase>
      </Meeting>
      <Family />
      <Sex />
      <Stalking />
      <Bullying />
    </Low>
  </Acronyms>
  - <Swearing>
    - <High>
      <Phrase>c**t</Phrase>
      <Phrase>f**k</Phrase>
      <Phrase>k**t</Phrase>
    </High>
    - <Medium>
      <Phrase>arse hole</Phrase>
      <Phrase>arsehole</Phrase>
      <Phrase>ass hole</Phrase>
      <Phrase>asshole</Phrase>
      <Phrase>s**t</Phrase>
    </Medium>
    - <Low>
      <Phrase>crap</Phrase>
    </Low>
  </Swearing>
</DictionaryCategories>
```

The invention claimed is:

1. A non-transitory computer readable storage medium having a computer program stored therein, wherein the program, when executed by a processor of a computer, causes the computer to execute the steps comprising:

providing a dictionary for referencing during analysis of an electronic communication in real time, said dictionary comprising a Hash-table store of expressions, wherein the Hash-table store for each expression comprises:

at least one section, corresponding to one of a plurality of grammatical functions; and at least one subject corresponding to one of a plurality of categories of expressions;

a weighted classification score associated with each expression;

an alert level assigned to each expression or plurality of expressions based on the weighted score; and computer readable instructions for determining an array of expressions of the electronic communication to be matched against the Hash-table store of expressions;

wherein the computer readable instructions, when operated on by the processor of the computer, are adapted to:

a) load a plurality of the expressions and their respective alert levels in the Hash-table, based on their respective subjects;

b) sample the electronic communication with the use of electronic filtering means;

c) form an array of data representing expressions from at least part of the sampled electronic communication;

d) search, using data processing means, for matches between expressions from the array of data and expressions stored in the Hash-table;

e) determine an aggregate alert level with regard to context and intent for the sampled communication based on the sum of the respective alert levels of the expressions stored in the Hash-table that match expressions in the array of data, and f) automatically transmit an alert message to a remote terminal via a telecommunications network, in response to the aggregated alert level reaching or exceeding a threshold;

wherein in response to the alert message, taking a plurality of actions that include:
  displaying an alert message at the user terminal;
  terminating the electronic communication; and
  shutting down the user terminal, and
wherein said step of shutting down the user terminal comprises responding to no response to the alert message being received from the remote terminal within a predetermined period of time.

2. The non-transitory computer readable storage medium as claimed in claim 1, wherein the computer readable instructions, when operated on by the processor of the computer are configured to produce an alert in response to the aggregated score reaching a predetermined threshold corresponding to one of a "low", "medium", "high" or "intermediate" threshold.

3. The non-transitory computer readable storage medium as claimed in claim 1, wherein an expression comprises one of:
  a word; and
  a phrase.

4. The computer-readable medium as claimed in claim 1, wherein the computer readable instructions are adapted to include the aggregate alert level in said alert message.

5. The computer-readable medium as claimed in claim 4, wherein the computer readable instructions are further adapted to receive a response from the remote terminal which indicates one of a plurality of actions to be taken, and to execute that action.

6. A method of monitoring an electronic communication, the method comprising the steps of:
  encoding a non-transitory computer-readable storage medium with a dictionary which references information during analysis of the electronic communications in real time, the dictionary comprising a Hash-table store of expressions wherein the Hash-table store for each expression comprises:
    at least one section, each section corresponding to one of a plurality of grammatical functions; and at least one subject, each subject corresponding to one of a plurality of categories of expressions;
    a weighted classification score associated with the expression; and
    an alert level assigned to an expression or plurality of expressions based on the weighted score;
  determining an array of expressions of the electronic communication to be matched against the Hash-table store of expressions;
  loading a plurality of the expressions and their respective alert levels in the Hash- table, based on their respective subjects;
  sampling the electronic communication with the use of electronic filtering means;
  storing a array of data representing expressions from at least part of the sampled electronic communication;
  searching, using data processing means for matches between expressions from the array of data and expressions stored in the hash-table;
  determining an aggregate alert level with regard to context and intent for the sampled communication based on the sum of the respective alert levels of the expressions stored in the Hash-table that match expressions in the array of data; and
  automatically transmitting an alert message to a remote terminal via a telecommunications network in response to the aggregated alert level reaching or exceeding a threshold,
  wherein in response to the alert message, taking a plurality of actions that include:
    displaying an alert message at the user terminal;
    terminating the electronic communication; and
    shutting down the user terminal, and
  wherein said step of shutting down the user terminal comprises responding to no response to the alert message being received from the remote terminal within a predetermined period of time.

7. The method of monitoring an electronic communication according to claim 6, wherein:
  the step of electronically sampling the electronic communication comprises filtering to determine untrusted communication data from trusted communication data.

8. The method as claimed in claim 7 further comprising preconditioning the untrusted communication data so as to provide a set of expressions, and
  wherein the step of preconditioning comprises expanding each expression such that common alternative expressions are included in the set of expressions.

9. The method of monitoring an electronic communication as claimed in claim 6, further comprising the step of:
  indicating the determined aggregate level to one or more of:
    a party to the electronic communication; and
    a third party to the electronic communication.

10. The method of monitoring an electronic communication as claimed in claim 6, further comprising the steps of:
  accumulating each match of an expression with a stored expression in a results collection; and
  determining a score for the results collection in accordance with predetermined rules, where the determined score corresponds to an aggregate alert level for the matched expressions and wherein the aggregate alert level is utilized to facilitate monitoring of the electronic communication.

11. The method as claimed in claim 10, wherein the predetermined rules for determining a score are based on criteria relating to the relationship of words in an expression of one section of the dictionary to words in an expression of another section of the dictionary.

12. The method as claimed in claim 6, wherein the method further comprises the step of:
  selecting one or more subjects for monitoring.

13. The method as claimed in claim 6, wherein the sample obtained from the step of sampling comprises one of:
  a stream of packets from a digital electronic communication; and
  a sample of expressions from an analog electronic communication.

14. The method as claimed in claim 6, wherein the steps of claim 6 are repeated throughout the duration of the electronic communication in real time.

15. The method as claimed in claim 6, wherein the electronic communication comprises one of:
  an internet chat session;
  a mobile telephone call;
  a WWW browsing session;
  an email communication;
  an SMS communication; and
  a MMS communication.

16. The method as claimed in claim 6, further comprising the step of expanding each expression stored in the dictionary so as to include in the dictionary common alternatives to that expression.

17. The method as claimed in claim 6, wherein an alert is produced in response to the aggregated score reaching a predetermined threshold that corresponds to one of a "low", "medium", "high" or "intermediate" threshold.

* * * * *